(12) United States Patent
Maeda et al.

(10) Patent No.: US 11,131,888 B2
(45) Date of Patent: Sep. 28, 2021

(54) DISPLAY PANEL AND DISPLAY APPARATUS

(71) Applicant: SAKAI DISPLAY PRODUCTS CORPORATION, Sakai (JP)

(72) Inventors: Atsuko Maeda, Sakai (JP); Shintaro Yamada, Sakai (JP); Katsumi Kondo, Sakai (JP); Hideki Nakagawa, Sakai (JP); Toshihiro Yamashita, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 19 days.

(21) Appl. No.: 16/606,610

(22) PCT Filed: May 22, 2017

(86) PCT No.: PCT/JP2017/019094
§ 371 (c)(1),
(2) Date: Feb. 26, 2020

(87) PCT Pub. No.: WO2018/216086
PCT Pub. Date: Nov. 29, 2018

(65) Prior Publication Data
US 2021/0116729 A1    Apr. 22, 2021

(51) Int. Cl.
*G02F 1/1337*     (2006.01)
*G02F 1/1362*     (2006.01)
*G02F 1/1368*     (2006.01)

(52) U.S. Cl.
CPC .......... *G02F 1/1337* (2013.01); *G02F 1/1368* (2013.01); *G02F 1/136209* (2013.01)

(58) Field of Classification Search
None
See application file for complete search history.

(56) References Cited

U.S. PATENT DOCUMENTS 5,963,290 A * 10/1999 Murai ............... G02F 1/133707
349/191
6,097,463 A *  8/2000 Chen ................. G02F 1/133753
349/130

(Continued)

FOREIGN PATENT DOCUMENTS

JP    H11-149078 A     6/1999
JP    2001-324715 A   11/2001

(Continued)

OTHER PUBLICATIONS

H. Yoshida, et al.: "Four-domain divided inclined vertical alignment by Irradiation of Unpolarized Ultra Violet Light", Jpn. J. Appl. Phys. vol. 36, p. L1449 (1997).

(Continued)

*Primary Examiner* — Ryan Crockett
(74) *Attorney, Agent, or Firm* — ScienBiziP, P.C.

(57) ABSTRACT

In a display panel, all of a plurality of directors of liquid crystal composition composing the liquid crystal layer are essentially perpendicular to the first alignment film and the second alignment film in the absence of applied voltage. A liquid crystal layer included in each of a plurality of unit pixels arranged in a matrix along a row direction and along a column direction has a single alignment state. A director of liquid crystal composition located at a central portion in a first unit pixel that is one of the plurality of unit pixels is in an opposite orientation with respect to a director of liquid crystal composition located at a central portion in a second unit pixel that is in a same row or a same column as the first unit pixel.

14 Claims, 22 Drawing Sheets

(56) References Cited

U.S. PATENT DOCUMENTS

| | | | |
|---|---|---|---|
| 8,629,950 B2* | 1/2014 | Kim | G09G 3/3648 349/48 |
| 2001/0048494 A1* | 12/2001 | Koma | G02F 1/1393 349/110 |
| 2005/0041169 A1* | 2/2005 | Hashimoto | G02F 1/1368 349/43 |
| 2005/0184952 A1 | 8/2005 | Konno et al. | |
| 2009/0147200 A1* | 6/2009 | Okuyama | G02F 1/13378 349/127 |
| 2009/0231530 A1* | 9/2009 | Nishimura | G02F 1/1323 349/129 |
| 2010/0123859 A1* | 5/2010 | Son | G02F 1/1333 349/93 |
| 2010/0208183 A1* | 8/2010 | Kim | C09K 19/12 349/124 |
| 2012/0293763 A1* | 11/2012 | Inoue | G03F 1/50 349/178 |
| 2015/0160507 A1 | 6/2015 | Katsuta et al. | |
| 2015/0205151 A1* | 7/2015 | Kamada | G02F 1/1337 349/112 |
| 2016/0027921 A1* | 1/2016 | Miyake | H01L 29/78696 349/46 |
| 2016/0266442 A1* | 9/2016 | Kuboki | G02F 1/137 |
| 2017/0038634 A1* | 2/2017 | Katsuta | G02B 6/0046 |

FOREIGN PATENT DOCUMENTS

| | | |
|---|---|---|
| JP | 2002-072204 A | 3/2002 |
| JP | 2005-258403 A | 9/2005 |
| JP | 2010-002727 A | 1/2010 |
| JP | 2012-503210 A | 2/2012 |
| JP | 2012-234117 A | 11/2012 |
| JP | 2017-078866 A | 4/2017 |
| WO | 2011/089772 A1 | 7/2011 |
| WO | 2014/024814 A1 | 2/2014 |
| WO | 2015/159943 A1 | 10/2015 |

OTHER PUBLICATIONS

S. Katsuta, et al.: "Optical design and roll-to-roll fabrication process of microstructure film for wide viewing LCDs", Journal of SID, vol. 22, Issue 6, 296-309 (2015).

S. Ochi, et al.: "Development of Wide Viewing VA-LCD System by Utilizing Microstructure Film" IDW16, 472-475 (2016).

K. Okamoto: "VA mode: Promising Candidate for Upcoming New Imaging Era" IDW'08, 1535-1538 (2008).

* cited by examiner

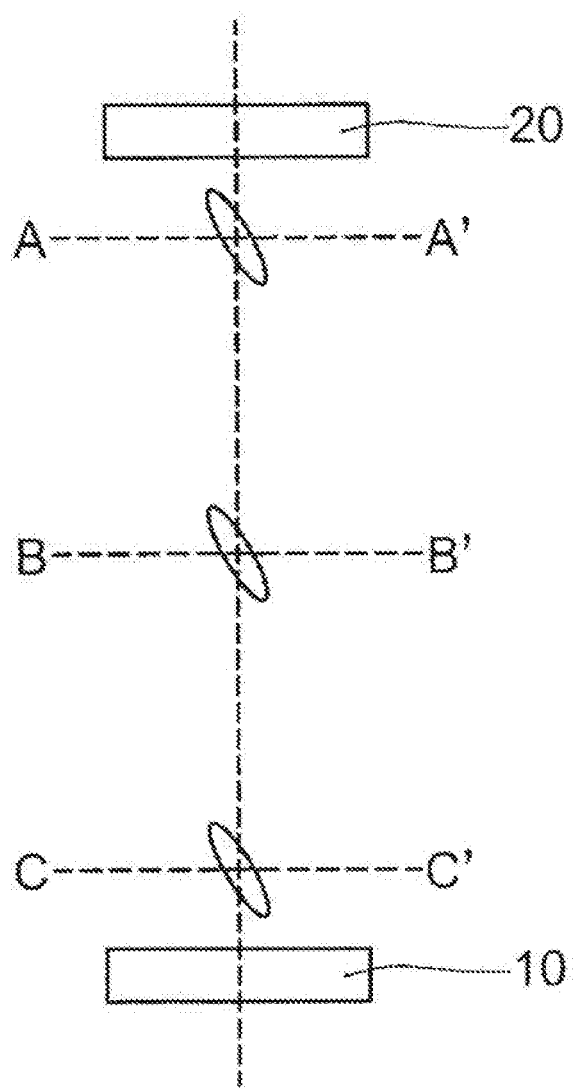

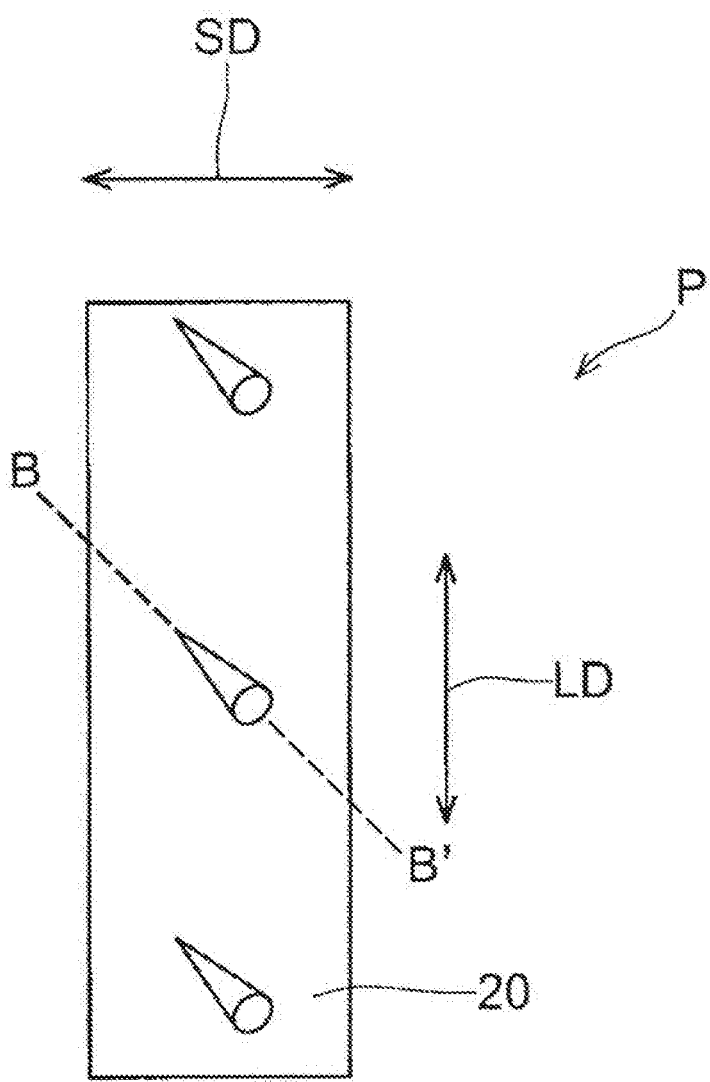

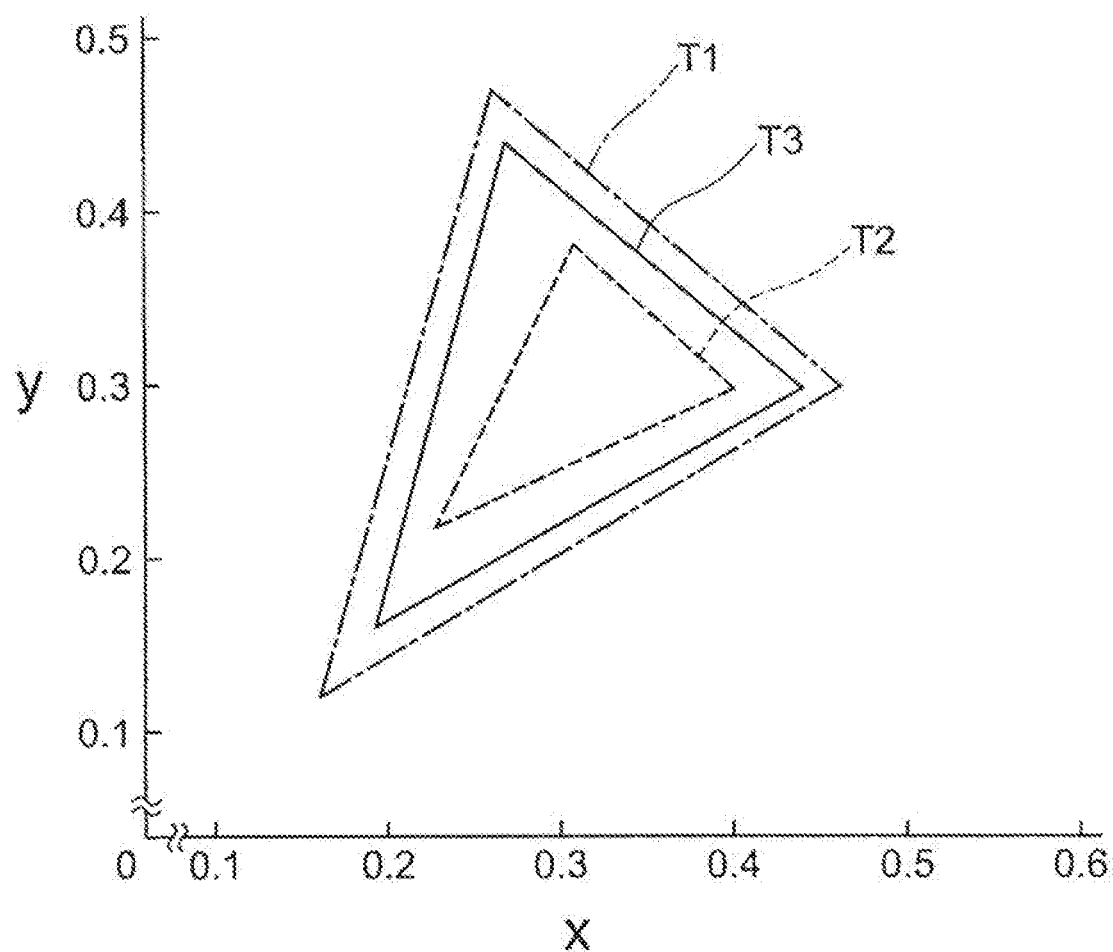

DISPLAY PANEL AND DISPLAY APPARATUS

TECHNICAL FIELD

The present invention relates to a display panel and a display apparatus.

BACKGROUND ART

Liquid crystal display apparatuses are widely prevalent, including not only medium- or small-sized display apparatuses such as mobile electronic devices, but also display apparatuses for use in television sets, digital signage, and so on. Large-sized display apparatuses are becoming more prevalent each year; in particular, display apparatuses that are sized 50 inches or above are accounting for increasingly greater proportions. However, regarding ease of installation, it is not preferable to increase the size of a display apparatus beyond a certain point; it is believed that, at least for personal use, display apparatus size can only be about 75 inches at the most.

On the other hand, there are still high demands for high-resolution display apparatuses, and the number of pixels in a display apparatus is still increasing. Specifically, from the conventional full high vision FHD (1,920×1,080, 8,294,400 dots) to 4K (3,840×2,160, 8,294,400 dots), and to DCI (Digital Cinema Initiatives) (4,096×2,160, 8,847,360 dots), the number of pixels is rapidly increasing. Furthermore, 8K (7,680×4,320, 33,177,600 dots) display apparatuses, possessing 16 times as many pixels as in full high vision, are becoming commercialized. It is expected that high-resolution display apparatuses may potentially become widely prevalent as breakthrough key components, not only in broadcast use, but also in medical fields and the like.

Moreover, technological advancement in image quality is expected of liquid crystal display apparatuses; the range of color rendition is being enlarged and high dynamic range (HDR) applications are being developed. As for the range of color rendition, attempts are made to achieve displaying in a manner that covers as wide a range of color rendition distinguish to the humans as possible, and one light-emitting material after another are being developed for widening the color gamut of backlights. Similarly, as for HDR applications, since humans have such characteristics that their sensitivity has a very broad dynamic range with respect to brightness, development of techniques that reconcile very bright displaying and very dark displaying is expected in display apparatuses.

The dynamic range of the human eye is said to be approximately $10^5$. In other words, a contrast ratio (ratio between light and dark) that is distinguishable to the human eye is equivalent to 100,000:1. Considering the dynamic range of the human eye, in order to achieve displaying in a manner that has the reality of natural objects by reconciling very bright displaying and very dark displaying, a display panel that has a contrast ratio (also referred to as native contrast) of at least 5,000:1 or more, and desirably 10,000:1 or more, is required.

Examples of currently prevalent display modes for liquid crystal display apparatuses include: the VA (Vertical Alignment) approach, where the director of liquid crystal composition is aligned essentially perpendicular to the substrate plane in the absence of applied voltage; and the IPS (In-Plane Switching: horizontal alignment) approach, where it is aligned essentially parallel to the substrate plane. In a liquid crystal display apparatus of a display mode under the VA approach, the contrast ratio in frontal view is on the order of 3,000 to 5,000:1, such values being considered as good. However, when a liquid crystal display apparatus of a display mode under the VA approach is viewed in an oblique direction, the contrast ratio lowers to a greater degree than in frontal view, and the color tone will change greatly. In other words, display modes under the VA approach have the shortcoming that the range of color rendition as viewed in an oblique direction is considerably narrower than that in frontal view.

Note that a director represents a direction in which the rod-shaped liquid crystal molecules that are contained in a liquid crystal composition (an aggregate created by intermolecular interactions) composing a liquid crystal layer are oriented on average. A director reflects the property of molecules composing the liquid crystal composition and therefore their electrical, dynamic, and optical properties have anisotropy. However, in order to facilitate the understanding of the technological field concerning liquid crystals, such properties of directors in a liquid crystal composition within a liquid crystal layer are generally treated as if uniform.

On the other hand, the IPS approach is superior to the VA approach in that the viewing angle dependence is small and there is hardly any variation in color. However, in display modes under the IPS approach, the contrast ratio can at most be on the order of 1,700 in all viewing angle directions.

Thus, the VA approach is of such a nature that the contrast ratio in frontal view is high but the viewing angle is narrow. Techniques for alleviating the shortcoming of the VA approach, i.e., viewing angle dependence, have also been developed: for example, attempts to suppress viewing angle dependence by splitting one pixel into a plurality of domains are currently being made.

The approach which provides a plurality of domains is called a multi-domain approach. Under the multi-domain approach, the alignment state of the liquid crystal layer within a unit pixel differs from domain to domain. In the present specification, a "unit pixel" refers to, as in color displaying, a pixel that corresponds to a region per color among regions opposed to color filters of e.g. three primary colors. Under the multi-domain approach, the entire plurality of domains corresponding to one color would correspond to a unit pixel. Among practical applications of the VA approach, those directed to 4 domains are most prevalent (see Non-Patent Document 1), and practical applications of 8 domains are also being under way.

On the other hand, the IPS approach is of such a nature that the contrast ratio in frontal view is low, although the viewing angle is wide. For an improved contrast ratio, the actual practice is to combine it with an area-active approach, where the light amount in each region of a backlight unit that is split into a plurality of regions is modulated in accordance with image brightness (see Patent Document 1).

However, the area-active approach has a problem in that boundaries between the split regions of the backlight unit are visible, which make it unpreferable to increase the degree of light amount modulation. Moreover, the IPS approach by principle permits fluctuations in threshold voltage because of variations in the widths of interdigitated electrodes and intervals between electrodes, thus being prone to unevenness in luminance. Similarly, the IPS approach is also sensitive to fluctuations in the liquid crystal cell gap (liquid crystal layer thickness).

CITATION LIST

Patent Literature

Patent Document 1] Japanese Laid-Open Patent Publication No. 2005-258403

Patent Document 2] Japanese Laid-Open Patent Publication No. 2002-72204

Patent Document 3] Japanese Laid-Open Patent Publication No. 2012-234117

Patent Document 4] International Publication No. 2014/024814

Patent Document 5] International Publication No. 2011/089772

Non-Patent Literature

Non-Patent Document 1] H. Yoshida, et al., "Four-domain divided inclined vertical alignment by Irradiation of Unpolarized Ultra Violet Light", Jpn. J. Appl. Phys. Vol. 36, p. L1449 (1997)

Non-Patent Document 2] S. Katsuta, et al., "Optical design and roll-to-roll fabrication process of microstructure film for wide viewing LCDs", Journal of SID, Vol. 22, Issue 6, 296-309 (2014)

Non-Patent Document 3] S. Ochi, et al., "Development of Wide Viewing VA-LCD System by Utilizing Microstructure Film" IDW16, 472-475 (2016)

Non-Patent Document 4] K. Okamoto, "VA mode: Promising Candidate for Upcoming New Imaging Era" IDW'08, 1535-1538 (2008)

SUMMARY OF INVENTION

Technical Problem

Thus, regarding display modes for large-sized liquid crystal display apparatuses, it can be said that the VA approach is superior to the IPS approach in terms of both of producibility and quality. However, viewing angle dependence is not completely eliminated even in a VA approach to which multi-domain approach is introduced (called MVA). Practical applications exist of an approach where a thin film transistor is formed for each domain, and signal voltages are externally applied to them each individually, thus to alleviate viewing angle dependence; however, such an approach will highly complicate the structure in a unit pixel.

With display panels according to the conventional techniques, it is difficult to simultaneously achieve in a popular size a high resolution of 4K, 8K, etc., a wide color gamut, a wide viewing angle, and a high dynamic range. Liquid crystal display apparatuses which satisfy all such demands, and a technique that enables mass production is aspired for.

The present invention has been made in order to solve the aforementioned problems, and an objective thereof is to, in the context of high-resolution displaying on a large screen of popular sizes, provide a display apparatus that has all of these properties: wide viewing angle, wide color gamut, and high dynamic range.

Solution to Problem

One implementation of the present invention is directed to a display panel including a first substrate and a second substrate, a liquid crystal layer retained therebetween, a first alignment film provided on a surface of the first substrate facing toward the liquid crystal layer, and a second alignment film provided on a surface of the second substrate facing toward the liquid crystal layer. In the display panel according to the present embodiment, all of a plurality of directors of liquid crystal composition composing the liquid crystal layer are essentially perpendicular to the first alignment film and the second alignment film in the absence of applied voltage; a liquid crystal layer included in each of a plurality of unit pixels arranged in a matrix along a row direction and along a column direction has a single alignment state; and a director of liquid crystal composition located at a central portion in a first unit pixel that is one of the plurality of unit pixels is in an opposite orientation with respect to a director of liquid crystal composition located at a central portion in a second unit pixel that is in a same row or a same column as the first unit pixel.

One implementation of the present invention is directed to a display apparatus comprising: the above display panel; a light source section to emit light toward the first substrate; and a light diffusing member having a light input plane facing toward the display panel and an light output plane as an opposite plane, the light diffusing member allowing light which is emitted from the display panel to be diffused and output from the light output plane. In the display apparatus according to the present embodiment, a full width of a polar angle corresponding to a decrement from a luminance, at the front, of light which is output from the light output plane to $\frac{1}{3}$ of the luminance is 85° or more but less than 180°.

Advantageous Effects of Invention

According to one implementation of the present invention, there is provided a display apparatus that simultaneously achieves properties such as reconciliation of a wide viewing angle and a high resolution and attainment of a wide color gamut and a high dynamic range, especially regarding display apparatuses being sized about 75 inches or less and having a high resolution (e.g. 4K, DCI, 8K). Also, according to one implementation of the present invention, it is possible to prevent decreases in transmittance and response speed that are associated with discrete regions occurring at boundaries between split pixels and extending along the liquid crystal alignment direction.

BRIEF DESCRIPTION OF DRAWINGS

FIG. 4C A schematic illustration showing a director distribution of liquid crystal composition composing a liquid crystal layer in a unit pixel of a display panel according to an embodiment of the present invention.

FIG. 4F A schematic illustration showing a director distribution of liquid crystal composition composing a liquid crystal layer in a unit pixel of a display panel according to an embodiment of the present invention.

FIG. 11 A diagram showing change in the range of color rendition in the case where a display apparatus according to an embodiment of the present invention is viewed in an oblique direction.

DESCRIPTION OF EMBODIMENTS

Figure 1A:
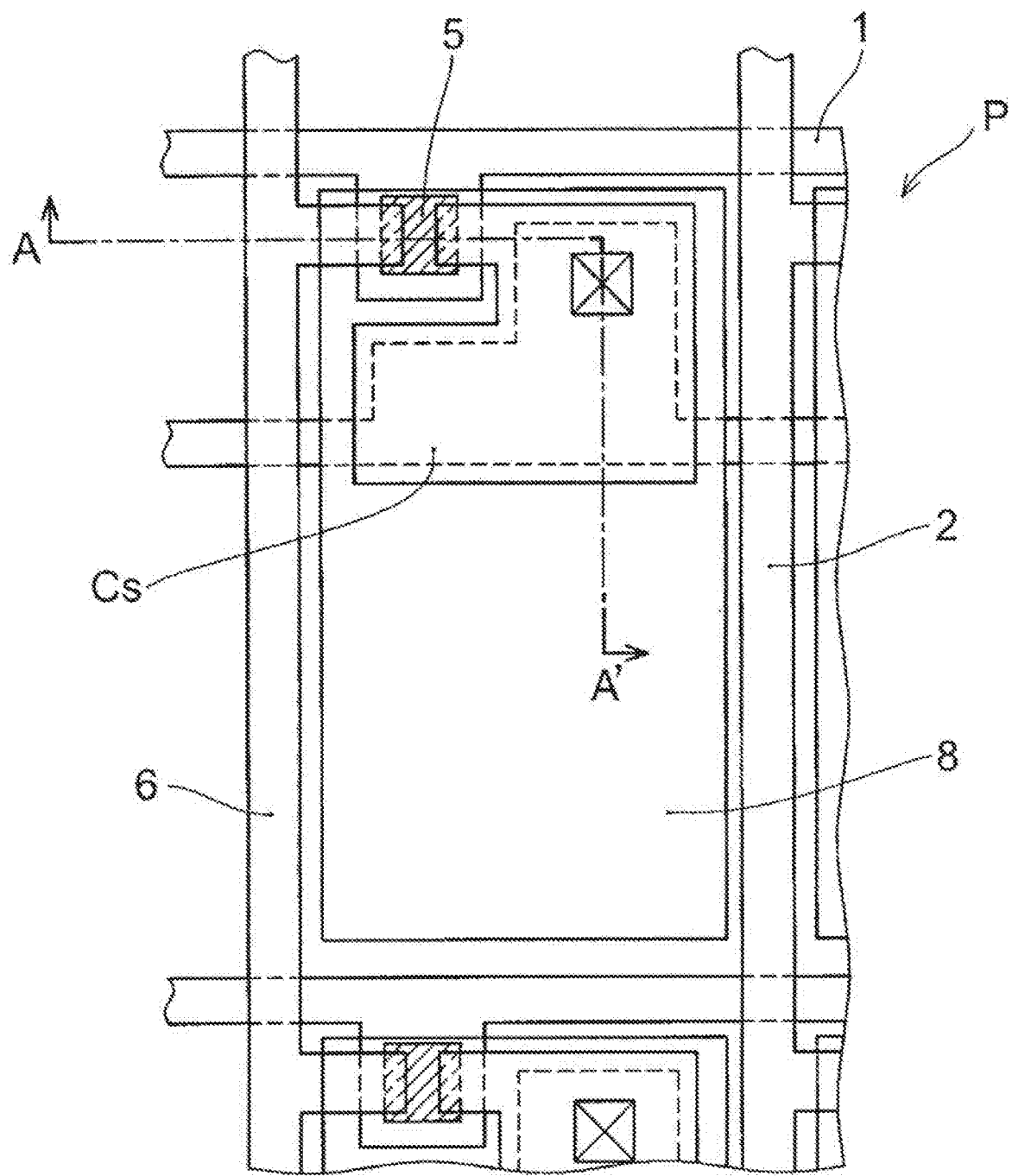
FIG. 1A A front view showing the structure of a unit pixel in a display apparatus according to an embodiment of the present invention.

Hereinafter, an embodiment of the present invention will be described with reference Lo FIG. 1A through FIG. 11.

First, the structure of a unit pixel of a display apparatus 100 according to an embodiment of the present invention will be described with reference to FIG. 1A and FIG. 1B. The display apparatus 100 of the present embodiment has a display panel 40, which includes a first substrate 10 having TFTs and pixel electrodes formed thereon, a second substrate 20 having a counter electrode formed thereon, and a liquid crystal layer 30 retained between the first substrate 10 and the second substrate 20, and also has a light source section 50 which emits light toward the first substrate 10 and a light diffusing member 60 which allows the light emitted from the display panel 40 to be diffused and output.

Figure 1B:
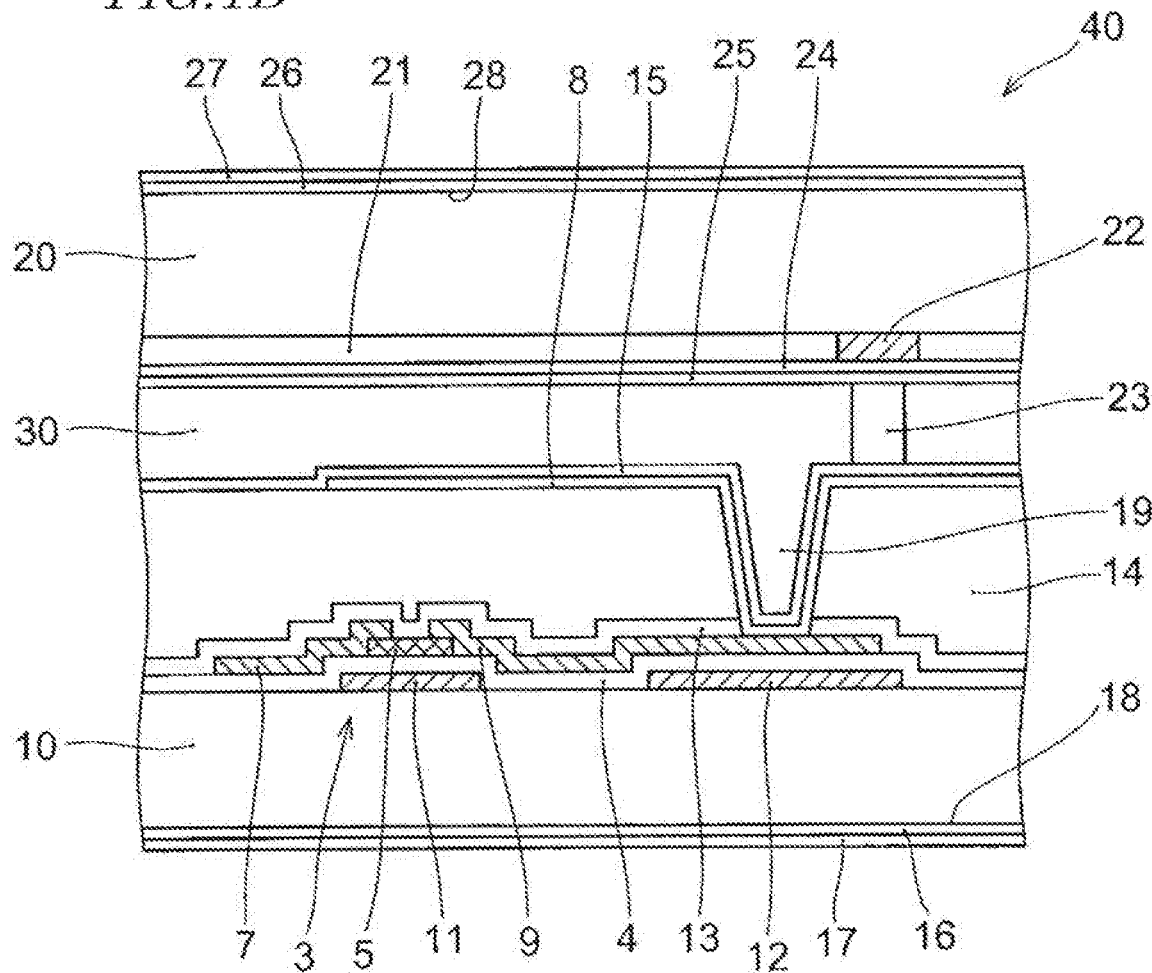
FIG. 1B A lateral cross-sectional view showing the structure of a display panel in a display apparatus according to an embodiment of the present invention.

FIG. 1A is a front view of the region of a unit pixel P as viewed from the front, and FIG. 1B is a cross-sectional view of the unit pixel P as viewed in a lateral direction, along line A-A' in FIG. 1A. The unit pixel is defined by two adjacent ones among a plurality of gate bus lines 1 and two adjacent ones among a plurality of source bus lines 6. As shown in FIG. 1B, on a surface of the glass substrate (first substrate) 10 facing toward the liquid crystal layer 30, a gate bus line 1 and a common bus line 2 are formed along a row direction (lateral direction in the figure), so as to reach the end of the displaying region. Since the gate bus line 1 composes a thin film transistor (TFT) 3, it protrudes downward in the figure. A gate insulating film 4 is formed so as to cover the region created by the protruding gate bus line 1, and a semiconductor layer 5 is patterned so as to further cover that region. A source electrode 7 protruding from the source bus line 6 so as to be in contact with the semiconductor layer 5 and a drain electrode 9, which is at the same potential as the pixel electrode 8, are formed with a certain distance therebetween (see FIG. 1B). Via a contact hole 19, the drain electrode 9 is connected with the pixel electrode 8 so as to be at the same potential as the pixel electrode 8; meanwhile, a storage capacitor Cs is created via an insulating film in the region protruding from the common bus line 2.

In certain portions on the surface of the first substrate 10, a gate electrode 11 that is connected to the gate bus line 1 and a common electrode 12 that is connected to the common bus line 2 are formed, and a gate insulating film 4 is layered so as to cover them. An island-shaped semiconductor layer 5 is formed on the gate electrode 11; at both ends thereof, the source electrode 7 connected to the source bus line 6 and the drain electrode 9 are formed with a certain distance therebetween, each of these covering the semiconductor layer 5. Note that the gate electrode 11 occupies a region broader than the island-shaped region of the semiconductor layer 5. Moreover, the gate electrode 11 is an opaque film, which is disposed in a position such that light from a light source being provided in the lower direction in the figure will not be incident on the semiconductor layer 5. Together with the semiconductor layer 5, the source electrode 7 and the drain electrode 9 are covered by an interlayer insulating film 13, with an organic insulating film 14 formed thereon. A hole is made in a portion of the interlayer insulating film 13, this serving as the contact hole 19 for connection with the transparent pixel electrode 8 on the organic insulating film 14. Thus, a thin film transistor 3 that is formed in one unit pixel of the display apparatus 100 according to an embodiment of the present invention is a reverse staggered type.

On the pixel electrodes 8, a first alignment film 15 is formed for causing the director of the liquid crystal composition composing the liquid crystal layer 30 to be aligned essentially perpendicular to the first substrate 10. On the surface of the glass substrate (second substrate) 20, which is opposed to the first substrate 10 via the liquid crystal layer 30, color filters 21 and a black matrix 22 are patterned, and a counter electrode 24 and a second alignment film 25 are further formed. Moreover, the liquid crystal layer 30 is retained by virtue of spacers 23 being disposed between the first alignment film 15 on the first substrate 10 and the second alignment film 25 on the second substrate 20.

Thus, in the display apparatus 100 of the present embodiment, as shown in FIG. 1A and FIG. 1B, the following are formed on a surface of the first substrate 10 facing toward the liquid crystal layer 30: pixel electrodes 8 constituting a plurality of unit pixels for generating an image to be displayed; source bus lines (signal lines) 6 for sending signals representing image information; gate bus lines (scanning lines) 1 for transmitting signals to the respective unit pixels; thin film transistors 3 of reverse staggered type for coupling together the source bus lines 6 and the gate bus lines 1; and gate electrodes (light shielding layer) 11 that block light from the light source to the thin film transistors 3.

Note that FIG. 1B is also a cross-sectional view of the liquid crystal panel (display panel) 40. The liquid crystal panel 40 includes the liquid crystal layer 30 being interposed between the first substrate 10 and the second substrate 20. The first substrate 10 includes a first surface 18 which receives light from the light source (not shown) that is provided in the lower direction in the figure, whereas the second substrate 20 includes a second surface 28 which is parallel to the first surface 18 and through which light is emitted. Phase plates 16 and 26 are respectively attached on the first surface 18 and the second surface 28, and polarizing plates 17 and 27 are further attached on the phase plates 16 and 26. Moreover, the director of the liquid crystal composition composing the liquid crystal layer 30 is uniform, and is aligned essentially perpendicular to the first substrate 10 and the second substrate 20 when no voltage for controlling the light transmittance of the liquid crystal panel 40 is being applied.

In the present specification, the expression that "the director of liquid crystal composition is aligned essentially perpendicular to the substrate" encompasses a state where the director of liquid crystal composition is aligned with a pretilt relative to a perpendicular direction to the substrate. In the present embodiment, in the absence of applied voltage, the director of the liquid crystal composition composing the liquid crystal layer is aligned with a pretilt of not less than 0.5° and not more than 5° from a perpendicular direction to the substrate. Although the angle is slightly exaggerated in the figure to demonstrate that the director is aligned with a pretilt from a perpendicular direction to the substrate, the angle is actually not less than 0.5° and not more than 5°. That is, in one embodiment, any director of liquid crystal composition that is included in the liquid crystal composition composing the liquid crystal layer is preferably aligned with a pretilt by an angle of not less than 0.5° and not more than 5° from a perpendicular direction to the substrate, in the absence of applied voltage.

Next, the material used for each constituent element will be described.

As the material of the semiconductor layer 5, a semiconductor material such as α-Si (Amorphous Silicon) or LTPS (Low-temperature Poly-Silicon) is used, for example. As the material of the gate insulating film 4, a silicon oxide film, a silicon nitride film, or a laminated film thereof, etc., is used, for example. As the material of the gate electrode 11, a laminated film of W (tungsten)/TaN (tantalum nitride); an Mo (molybdenum), Ti (titanium), Al (aluminum), Cu (copper) alloy; or the like is used, for example.

In the present embodiment, a liquid crystal composition whose dielectric anisotropy indicates a negative value is used as the liquid crystal composition composing the liquid crystal layer 30. Such a liquid crystal composition would include a mixture of a compound having a negative dielectric anisotropy and a compound having a neutral dielectric anisotropy. As exemplified by

[Formula 1]

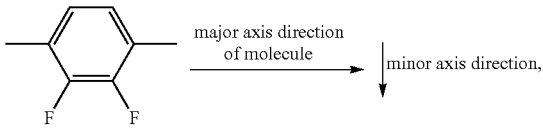

an example compound having a negative dielectric anisotropy may be a compound in which a functional group having an atom with large electronegativity (e.g., an F atom) substituted along the molecule minor axis direction is introduced in the center of the molecule backbone. An example thereof is the following structural formula (1).

[Formula 2]

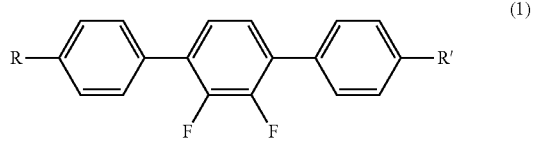

(1)

Another example compound having negative dielectric anisotropy may be a compound in which a functional group having an atom with large electronegativity (e.g., an F atom) substituted along the molecule minor axis direction is introduced at a molecule terminal. Examples thereof are the following structural formulae (2) to (5).

[Formula 3]

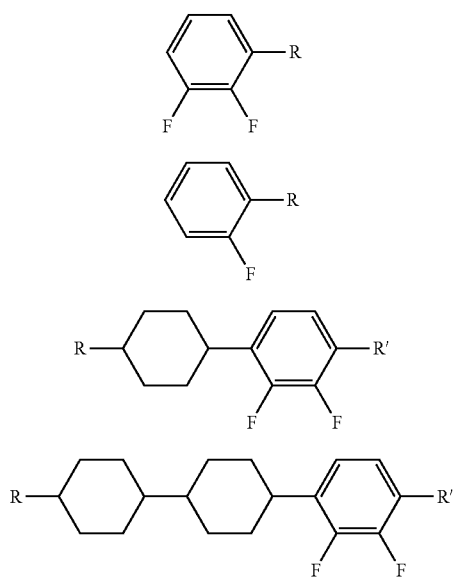

In the formula, R or R' is —$C_nH_{n+1}$ (alkyl group) or —O—$C_nH_{n+1}$ (alkoxyl group).

A neutral compound having hardly any dielectric anisotropy may be used to reduce viscosity or enhance mesomorphism at low temperatures. An example of a neutral compound is the following structural formula (6).

[Formula 4]

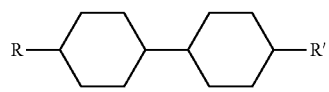

In the formula, R or R' is —$C_nH_{n+1}$ (alkyl group) or —O—$C_nH_{n+1}$ (alkoxyl group).

Figure 2A:
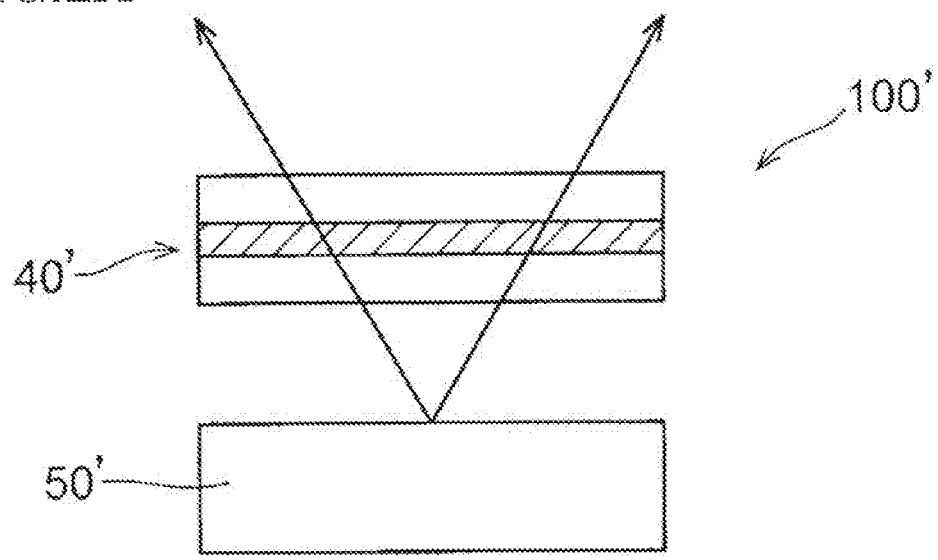
FIG. 2A A schematic illustration showing a lateral cross section of a conventional display apparatus.

Next, the construction of the display apparatus 100 of the present embodiment will be described with reference to FIG. 2A and FIG. 2B. FIG. 2A is a diagram showing a conventional display apparatus 100', and FIG. 2B is a diagram showing the display apparatus 100 of the present embodiment.

The conventional display apparatus shown in FIG. 2A includes a liquid crystal panel 40' and a backlight unit 50'. The VA approach or the IPS approach may be used for the liquid crystal panel 40' of the conventional display apparatus 100', for example.

Figure 2B:
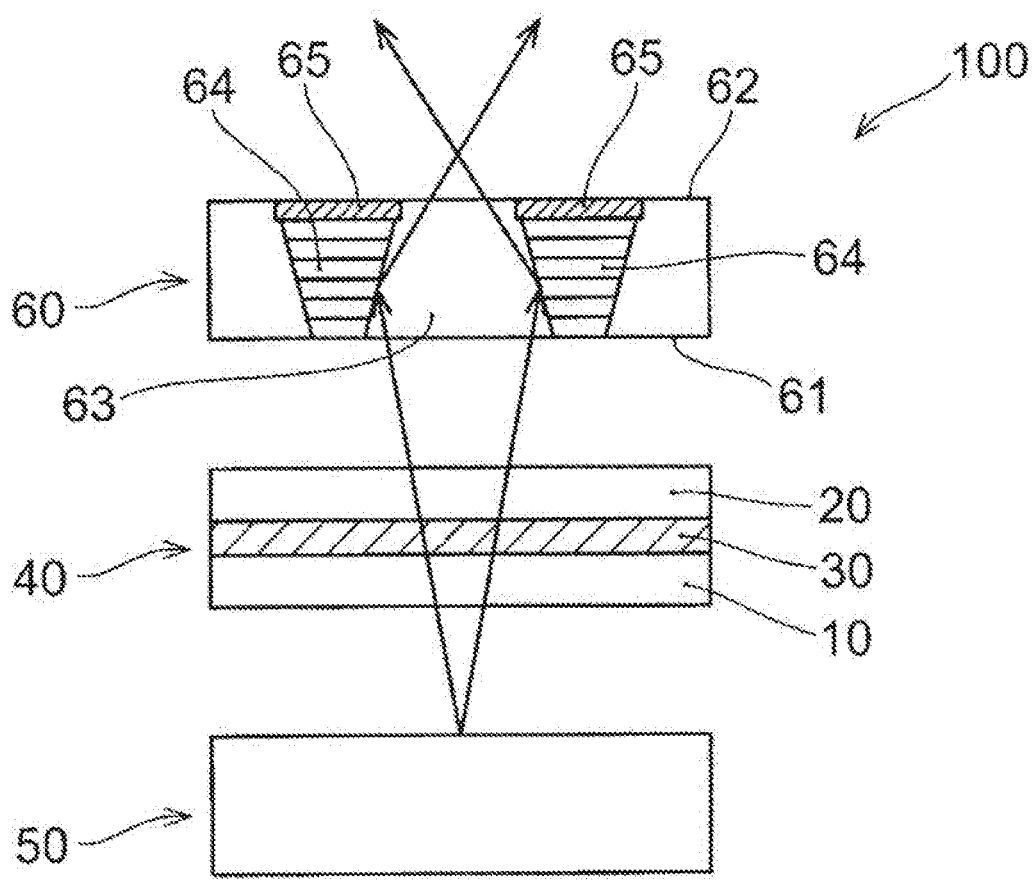
FIG. 2B A schematic illustration showing a lateral cross section of a display apparatus according to an embodiment of the present invention.

On the other hand, the display apparatus 100 of the present embodiment shown in FIG. 2B includes a liquid crystal panel 40, a backlight unit (light source) 50, and a viewing angle enlarging film (light diffusing member) 60. The VA approach is used for the liquid crystal panel 40 of the display apparatus 100 of the present embodiment.

Examples of backlight units that may be used for the display apparatus 100 of the present embodiment include the direct type and the edge light type, as are disclosed in Patent Documents 1 and 2. As the edge light type, a wedge type or the like may be used. Using a plurality of wedge types may enable area-active; therefore, as in the disclosure of Patent Document 2, a plurality of wedge types may be overlaid to suppress unevenness.

As the backlight unit 50, a white LED(s) is used, for example. Without being limited to white LEDs, red, blue, or green LEDs may be used.

In the viewing angle enlarging film 60 used in the display apparatus 100 of the present embodiment, light which is emitted from the second surface 20 of the liquid crystal panel 40 is, after entering the viewing angle enlarging film 60 from the light input plane 61, output from the light output plane 62 of the viewing angle enlarging film 60 with its angular distribution being expanded from what it was when emitted from the liquid crystal panel 40.

In the viewing angle enlarging film 60 used in the present embodiment, a plurality of light diffusing portions 63 are provided between the light input plane 61 and the light output plane 62, and a light shielding portion 64 is provided in the region excluding the light diffusing portions 63. The viewing angle enlarging film 60 used in the present embodiment may utilize air and a resin, for example, as in Non-Patent Document 4 and Non-Patent Document 2. In other words, the light shielding portion 64 may be structured as a throughhole continuously extending between the light input plane 61 and the light output plane 62, in which case the opening that is created in the light output plane 62 is preferably sealed by the light shielding film 65. Without being limited to air, it may be any material that has a different refractive index from that of resin. The viewing angle enlarging film 60 may be, as in Patent Document 4, for example, an antiglare member that is opposed to the light output plane 62 of the viewing angle enlarging film 60, this being in order to provide an enhanced antiglare property when an image on the display apparatus 100 of the present embodiment is viewed from the front; or an antiglare layer may be attached to the light output plane 62 of the viewing angle enlarging film 60. Those skilled in the art will be able to easily produce the aforementioned viewing angle enlarging film 60 in accordance with a protocol that is described in any literature.

Preferably, the degree of light diffusion in the present embodiment is such that a full width of a polar angle corresponding to a decrement from a luminance, at the front, of light which is output from the light output plane to ⅓ of the luminance is 85° or more. The full width of the polar angle is preferably less than 180° granted that it fits within the measurable range, or more preferably 178°, which is the detection limit under current measurement technology; in this case, some measuring instruments may measure it to be 176°.

As an arrow in the figure indicates its light path, the backlight unit 50' of the conventional display apparatus 100' does not have a high degree of convergence; for example, a backlight unit having a ⅓ width of backlight (described below) which is ±60° or greater by polar angle is used.

Figure 3A:
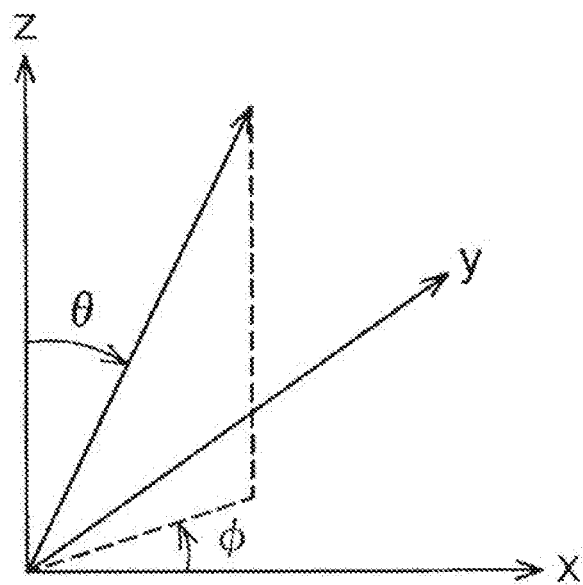
FIG. 3A A diagram showing definitions concerning angles (polar angle and azimuth angle) according to an embodiment of the present invention.
Figure 3B:
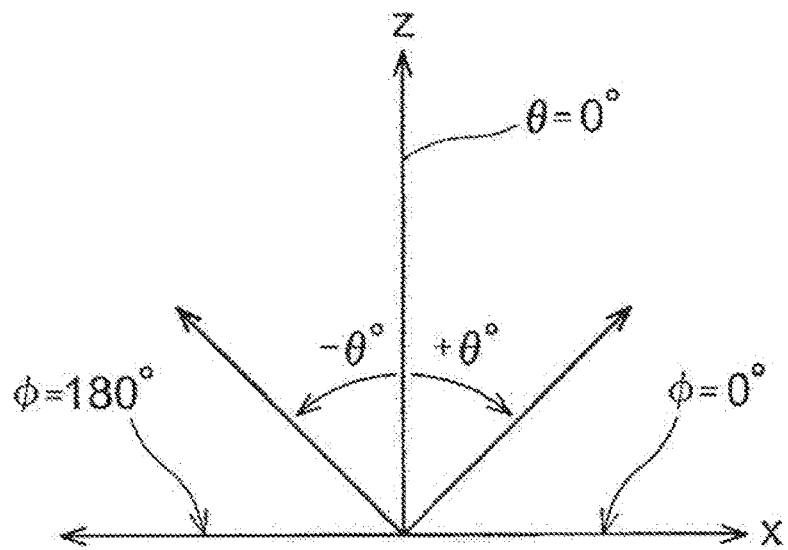
FIG. 3B A illustrate showing a definition concerning an angle (polar angle) according to an embodiment of the present invention.

As for the polar angle, as shown in FIG. 3A, an angle which a vector indicating a direction that is based on the positive direction along the z axis makes with respect to the z axis is defined as a polar angle θ. On the other hand, an angle which a vector that appears when the aforementioned vector is projected onto the xy plane makes with respect to the positive direction along the x axis is defined as an azimuth angle φ. Moreover, an arbitrary azimuth angle direction φ on the xy plane is illustrated in FIG. 3B, where, based on polar angle θ=0°, any polar angle in the φ° direction is defined as + (plus) θ, and any polar angle in the φ+180° direction is defined as − (minus) θ.

On the other hand, the backlight unit 50 of the display apparatus 100 of the present embodiment is preferably one that has an enhanced degree of convergence; for example, it preferably includes a light guide plate, a microlens sheet, a prism sheet, a louver film, or the like; for example, an optical film BEF (trade name, manufactured by Sumitomo 3 M Limited) having a prism pattern of acrylic resin formed on a polyester surface, or the like is used. Without being limited to the use of a prism sheet, a light converging function may be conferred to a light guide plate or the like, as is disclosed in Patent Document 3.

Thus, in the conventional display apparatus 100', backlight whose degree of convergence is not so high is emitted toward the liquid crystal layer. On the other hand, in the display apparatus 100 of the present embodiment, backlight which is more converged than that in the conventional display apparatus 100' of FIG. 2A is emitted toward the liquid crystal layer 30, and after being transmitted through the liquid crystal layer 30, emitted toward the viewing angle enlarging film 60.

Figure 3C:
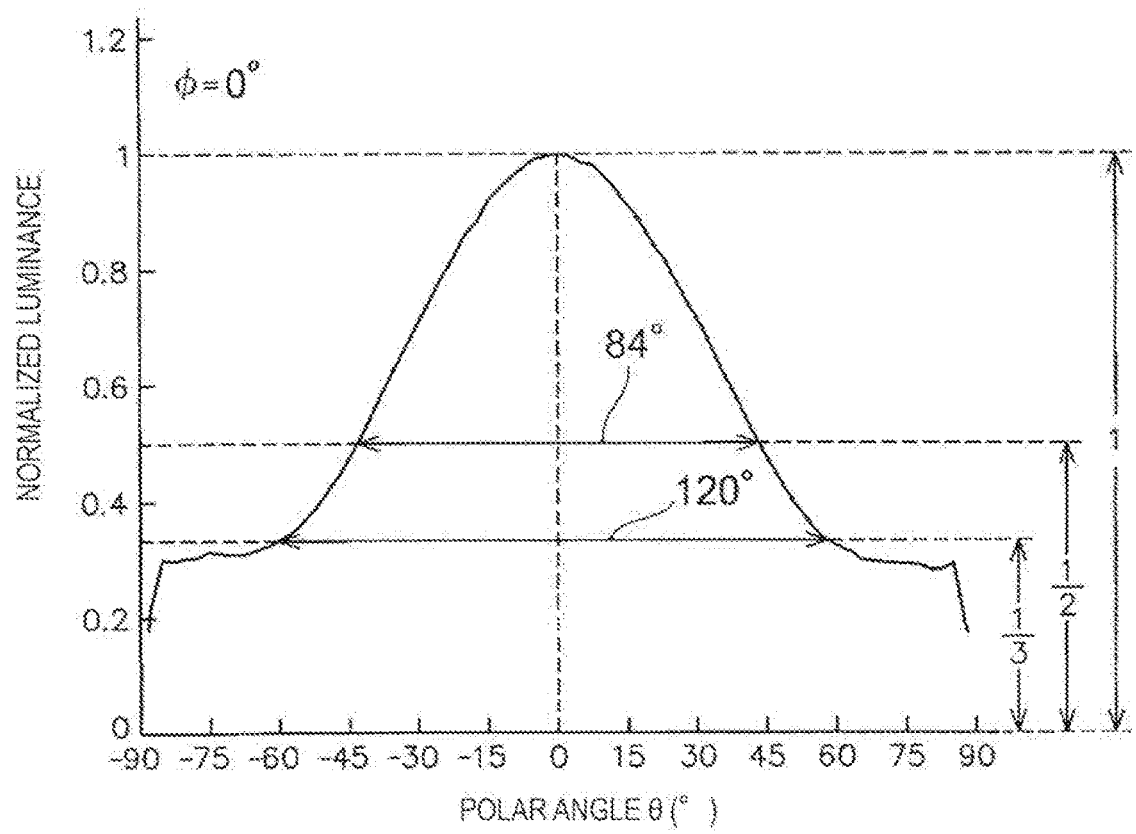
FIG. 3C Shows an example of a white luminance distribution for use in an embodiment of the present invention, where the backlight has a polar angle of 0°.
Figure 3D:
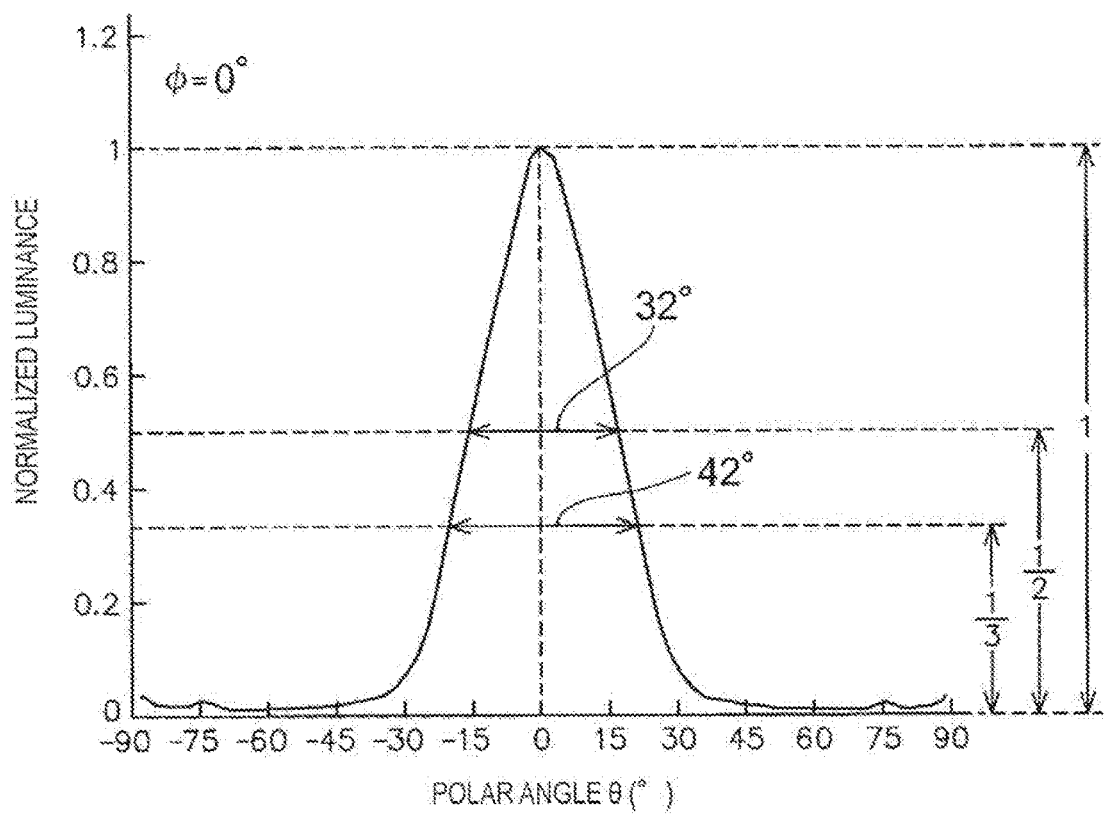
FIG. 3D Shows an example of a white luminance distribution for use in an embodiment of the present invention, where the backlight has a polar angle of 0°.
Figure 3E:
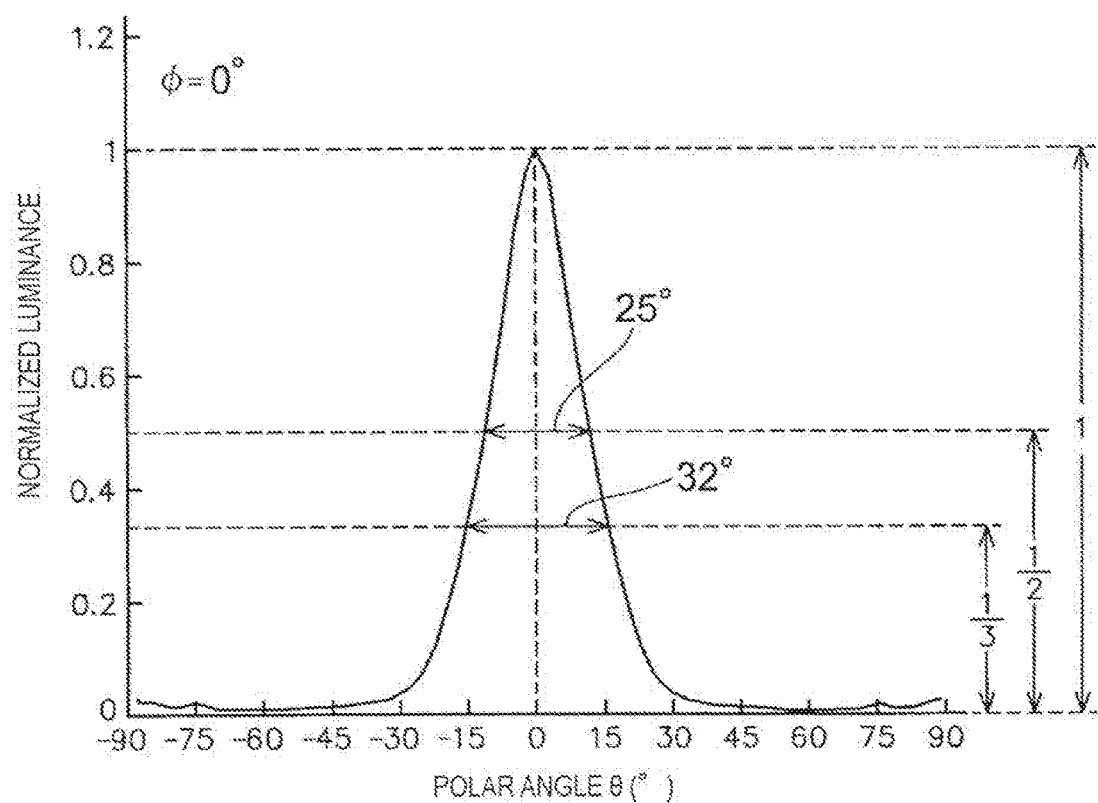
FIG. 3E Shows an example of a white luminance distribution for use in an embodiment of the present invention, where the backlight has a polar angle of 0°.

Examples of white luminance distribution of backlight used in the present embodiment in the case φ=0° are shown in FIG. 3C, FIG. 3D, and FIG. 3E. FIG. 3C illustrates an example where, regarding a luminance distribution in the polar angle luminance characteristics, a full width of a polar angle corresponding to a decrement from a luminance at the front of backlight to ½ of the maximum luminance (which in the present specification may also be referred to as a half width of backlight) is 84°, and a full width of a polar angle corresponding to a decrement to ⅓ of the maximum luminance (which in the present specification may also be referred to as a ⅓ width of backlight) is 120°. FIG. 3D illustrates an example where, regarding a luminance distribution in the polar angle luminance characteristics, a half width of backlight is 32° and a ⅓ width of backlight is 42°. FIG. 3E illustrates an example where, regarding a luminance distribution in the polar angle luminance characteristics, a half width of backlight is 25° and a ⅓ width of backlight is 32°. By using these examples, the mechanism behind viewing angle dependence appearing in a display apparatus under the VA approach will be discussed below.

Figure 4A:
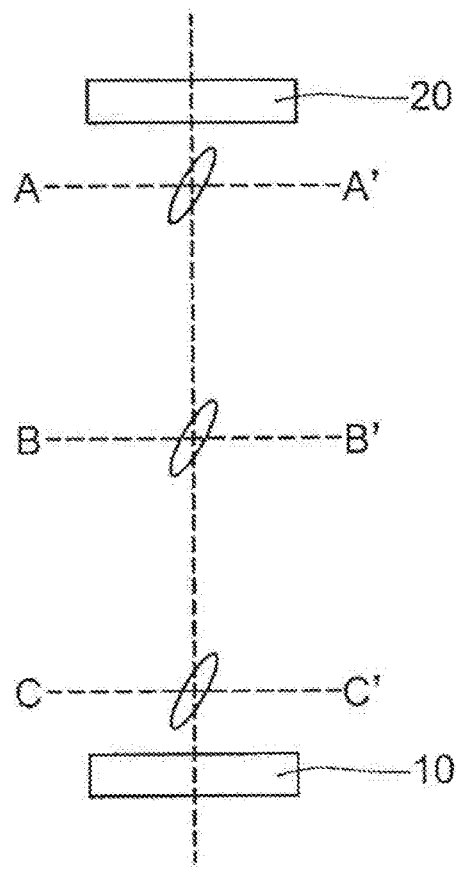
FIG. 4A A schematic illustration showing a director distribution of liquid crystal composition composing a liquid crystal layer in a unit pixel of a display panel according to an embodiment of the present invention.
Figure 7A:
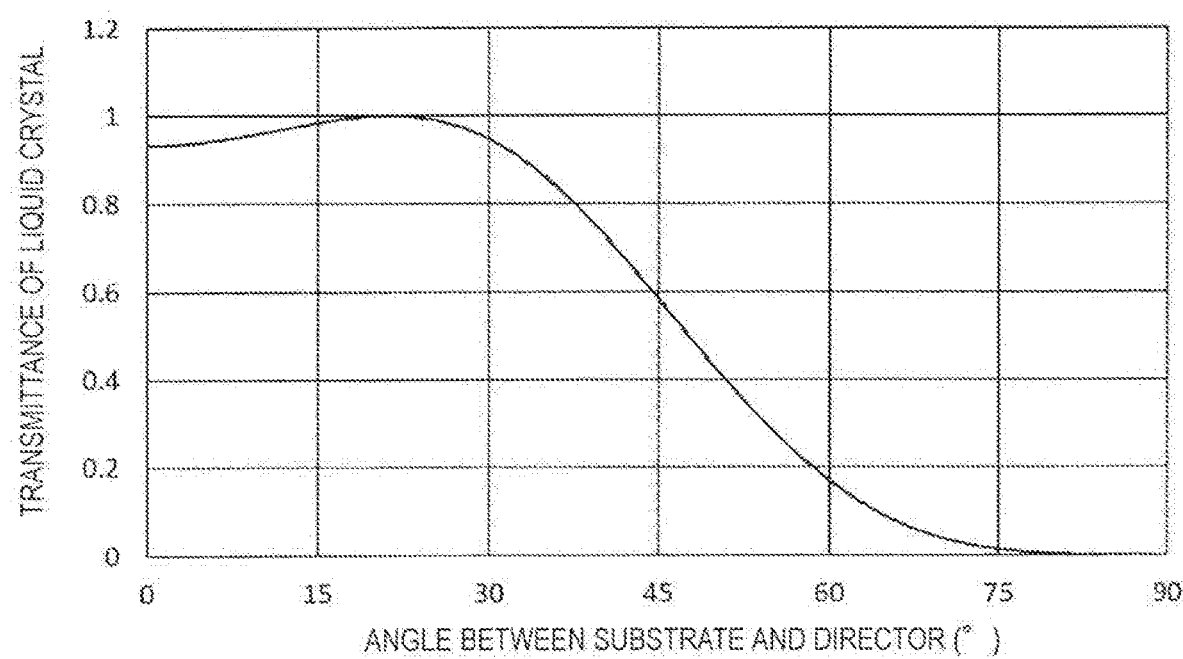
FIG. 7A Shows transmittance of the liquid crystal layer relative to angle (angle of inclination θ) between a director of liquid crystal composition and the substrate.
Figure 7B:
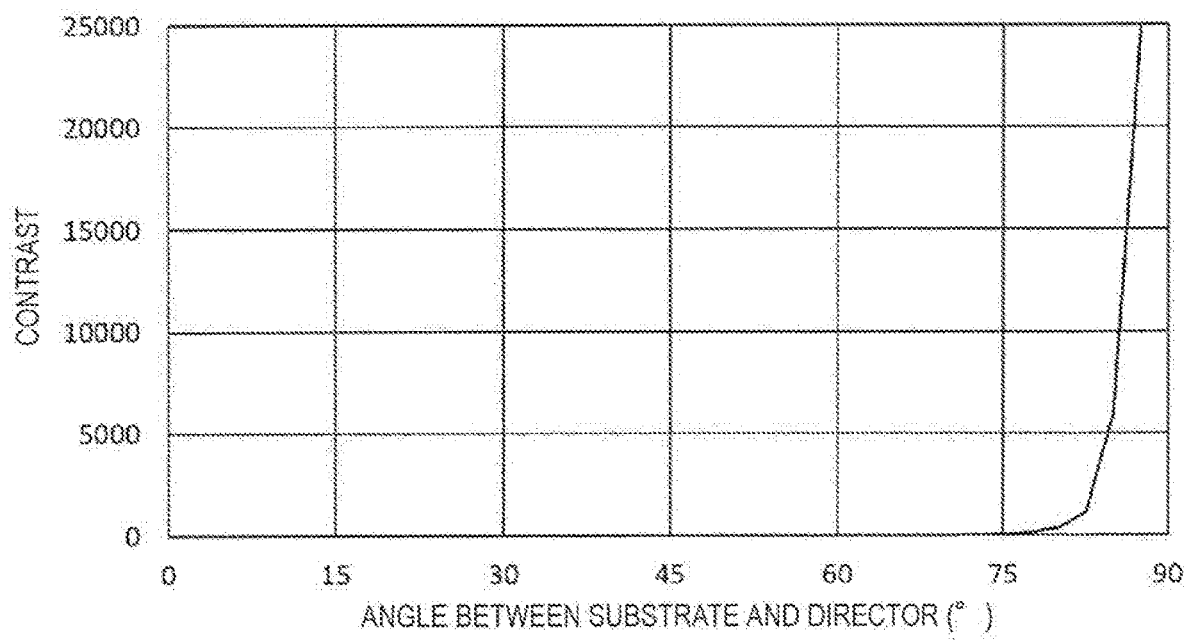
FIG. 7B Shows contrast relative to angle (angle of inclination θ) between a director of liquid crystal composition and the substrate.

FIG. 7A and FIG. 7B are diagrams showing relationships between the liquid crystal composition that is located in the central portion (B-B') in unit pixels shown in FIG. 4A and FIG. 4C, respectively, and light L from the light source. The liquid crystal composition used in the present embodiment has negative dielectric anisotropy, the director of liquid crystal composition being controlled by forming a structure that enables pretilting of the director of liquid crystal composition on the alignment film(s). The director, to which a tilt angle is conferred, becomes inclined as a voltage is applied between the glass substrates, and a change in its angle (angle of inclination θ) causes a change in retardation. Retardation is a product of multiplication between: a difference ($\Delta n(\theta)$) between the refractive index of the liquid crystal composition along the major axis direction and its refractive index along the minor axis direction; and a cell thickness (d). $\Delta n(\theta)$ can be expressed by eq. 1 below.

[Math. 1]

$$\Delta n(\theta) = \frac{n_1 n_2}{\sqrt{n_1^2 \sin^2\theta + n_2^2 \cos^2\theta}} - n_2 \qquad \text{eq. 1}$$

(n1: refractive index of the liquid crystal composition along the major axis direction, n2: refractive index of the liquid crystal composition along the minor axis direction) Moreover, the transmittance of liquid crystal can be expressed by eq. 2.

[Math. 2]

$$T = \sin^2 2\phi \sin^2\left\{\frac{\pi \Delta n \cdot d}{\lambda}\right\} \qquad \text{eq. 2}$$

(φ: angle between the molecular alignment direction and the transmission axis of the polarizing plate; λ: wavelength of incident light)

Figure 6A:
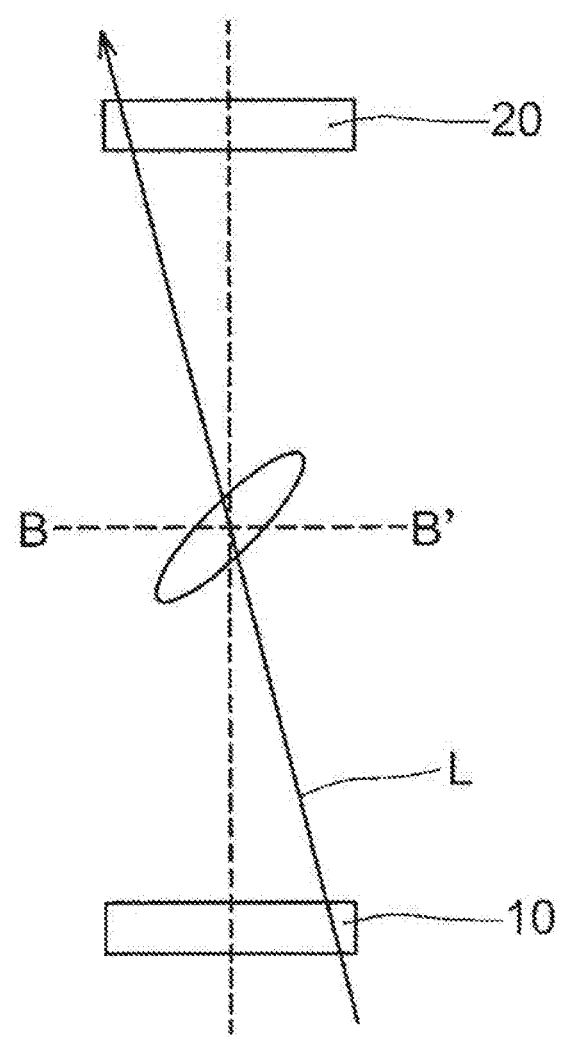
FIG. 6A A diagram showing a relationship between viewing angle and phase change under the Vertical Alignment (VA) approach.
Figure 6B:
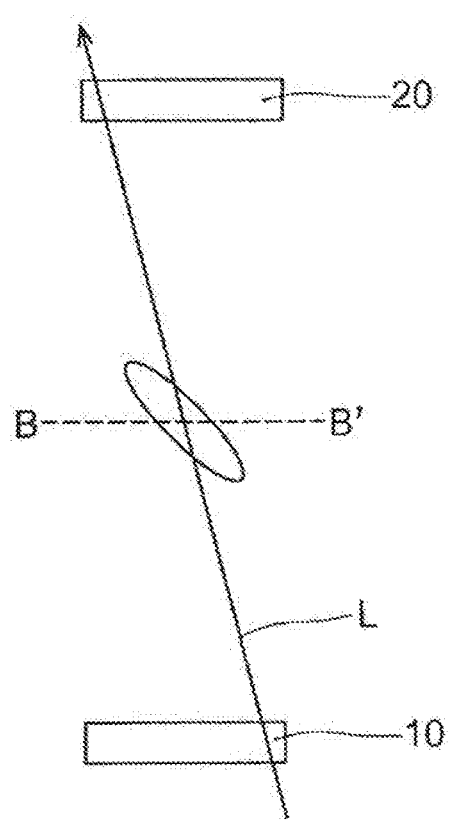
FIG. 6B A diagram showing a relationship between viewing angle and phase change under the Vertical Alignment (VA) approach.

A graph of transmittance of the liquid crystal layer with respect to the angle of inclination θ is shown in FIG. 7A. If light enters when the director of liquid crystal composition is oriented as shown in FIG. 6A, there is a greater retardation than when light enters in a perpendicular orientation to the substrate, and thus the transmittance of the liquid crystal layer increases. If light enters when the director of liquid crystal composition is oriented as shown in FIG. 6B, there is a smaller retardation than when light enters in a perpendicular orientation to the substrate, and thus the transmittance of the liquid crystal layer decreases.

Figure 7C:
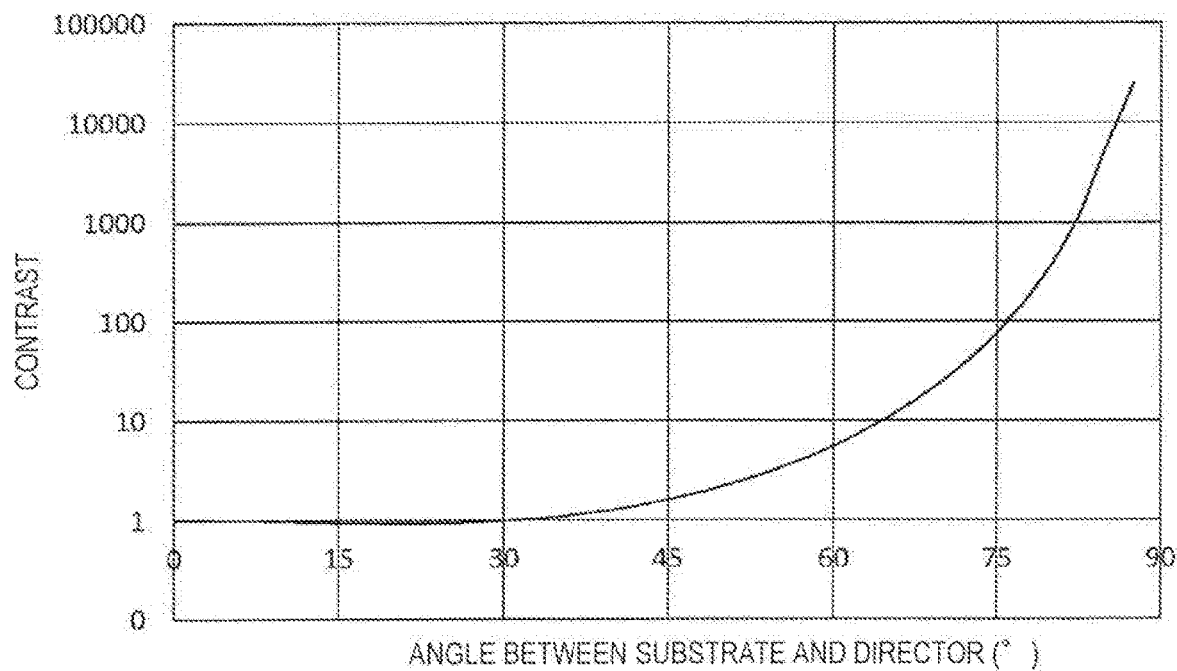
FIG. 7C Shows contrast (logarithm) relative to angle (angle of inclination θ) between a director of liquid crystal composition and the substrate.

Regarding a display apparatus in which a backlight having a half width of backlight is 84° (FIG. 3C), 32° (FIG. 3D), or 25° (FIG. 3E) is combined with the aforementioned display panel 40 and light diffusing member 60, a contrast at the front has been calculated. Specifically, a transmittance of the liquid crystal layer for each θ was calculated from eq. 2; a transmittance of the liquid crystal layer when θ=0° was defined as a white displaying state; and a contrast for each θ was calculated by dividing the transmittance of the liquid crystal layer when θ=0° with the transmittance of the liquid crystal layer for each θ. FIG. 7B shows a contrast distribution for each θ, and FIG. 7C shows a logarithmic distribution of contrast for each θ.

Regarding a display apparatus in which a backlight having a half width of backlight of 84° (FIG. 3C), 32° (FIG. 3D), or 25° (FIG. 3E) is combined with the aforementioned display panel 40 and light diffusing member 60, a contrast at the front has been measured. These measurement values are indicated in Table 1, together with the aforementioned calculation values.

TABLE 1

|  | A | B | C | B/A | C/A |
|---|---|---|---|---|---|
| backlight luminance half width (°) | 84 | 32 | 25 | 2.6 | 3.0 |
| calculation value | 3211 | 8241 | 9601 | 2.6 | 3.0 |
| measurement value | 3600 | 13000 | 16000 | 3.6 | 4.4 |

As indicated in Table 1, it has been found that when the half width of backlight becomes smaller, the calculation value increases as does the measurement value, with a rate of increase that is reproducible. Note that the calculation of the calculation value was performed under conditions void of any phase plate for compensating for the retardation in a black displaying state of the liquid crystal.

Thus, by enhancing the degree of convergence of backlight, the contrast of the display apparatus 100 of the present embodiment in frontal view increases.

As described earlier, in order to achieve displaying with reality, a display panel having a contrast ratio of at least 5,000:1 or more, and desirably 10,000:1 is needed. In display apparatuses of display modes under the VA approach that are commercially available at present, their contrast ratios in frontal view are on the order of 3,000 to 5,000:1. On the other hand, the display apparatus according to the present embodiment realizes a contrast ratio of 5000:1 or more, thus having a very excellent performance.

In a display apparatus according to the present embodiment, it is preferable that the contrast ratio in frontal view is 5000:1 or more; in order to realize such a contrast ratio, it is also preferable that a half width of backlight 60° or less, and more preferably 50° or less. Furthermore, in the display apparatus according to the present embodiment, it is preferable that the contrast ratio in frontal view is 10000:1 or more; in order to realize such a contrast ratio, it is also preferable that a half width of backlight is 40° or less, and more preferably 35° or less.

Figure 3F:
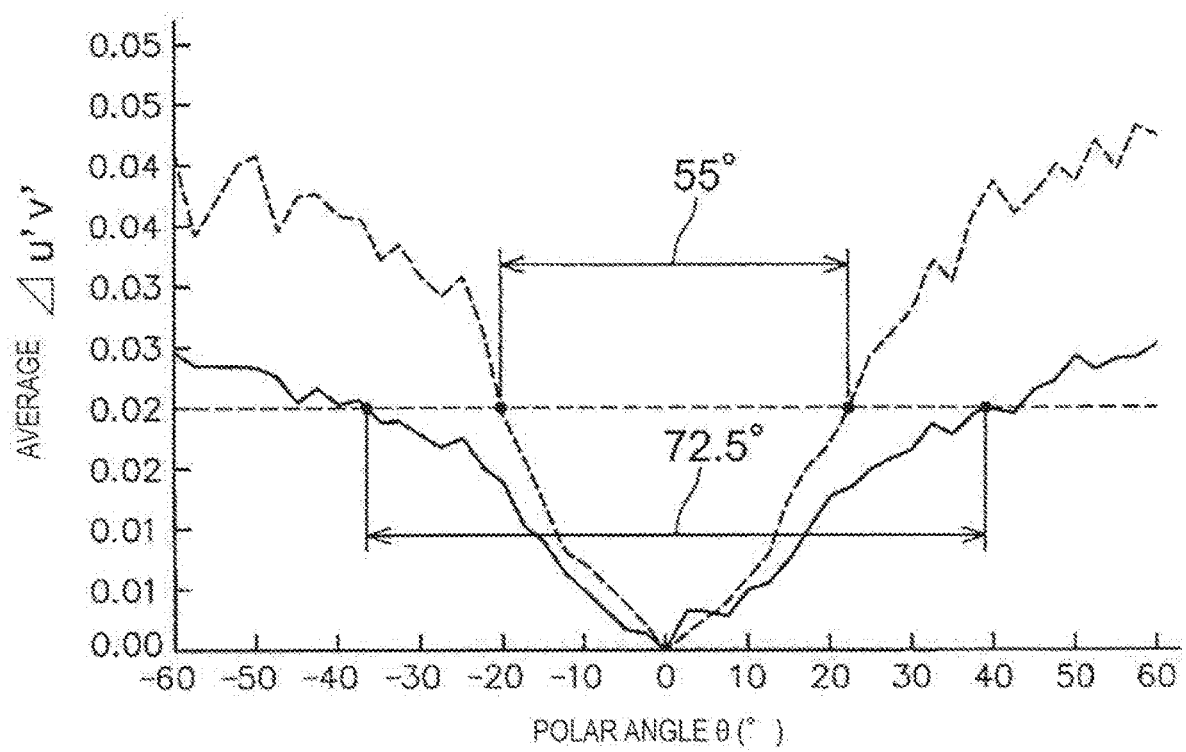
FIG. 3F Shows a relationship between the viewing angle and variations in color in a display apparatus according to the present embodiment in which a backlight having a white luminance distribution is used.

FIG. 3F shows a relationship between viewing angle and variation in color (chrominance Δu'v') in the display apparatus 100 of the present embodiment, where a backlight having a white luminance distribution shown in FIG. 3C or FIG. 3D is used. Herein, chrominance Δu'v' is defined by eq. 3 below.

[Math. 3]

$$\Delta u'v' = \sqrt{(u' \text{ at front-} u' \text{ at angle of view})^2 + (u' \text{ at front-} v' \text{ at angle of view})^2} \quad \text{eq. 3}$$

Note that the viewing angle is within a range of θ=±60° from the frontal view (θ=0°) in a direction perpendicular to the display surface given φ=0°. In order to eliminate influences of the external environment, the illumination environment was chosen to be pitch dark (illuminance=0 luxes). As for the variation in color, the polar angle was deemed as 65° for Δu'v'=0.020 from Non-Patent Document 3. In the display apparatus 100 of the present embodiment where a backlight having a white luminance distribution (contrast ratio 3600:1) as shown in FIG. 3C was used, the polar angle was 55° for Δu'v'=0.020; on the other hand, in the display apparatus 100 of the present embodiment where a backlight having a white luminance distribution (contrast ratio 13000:1) as shown in FIG. 3D was used, the polar angle was 72.5° for Δu'v'=0.020.

FIG. 11 is a diagram showing change in the range of color rendition when a display apparatus according to an embodiment of the present invention was viewed in an oblique direction. This shows, among nine colors which were taken from the Macbeth chart shown in Non-Patent Document 2, color coordinates (x,y) when displaying three colors of 13 (blue), 14 (green) and 15 (red). In the conventional 4-domain approach, as compared to the geometric area of a triangle T1 (see FIG. 11) as viewed in a perpendicular direction to the display surface (θ=0°), the geometric area of a triangle T2 as viewed in an oblique direction (θ=60°, and in all azimuthal directions φ=0 to 360°) is considerably narrow, resulting in pale colors. On the other hand, in the present embodiment, the geometric area of a triangle T3 as viewed in an oblique direction (θ=60°, and in all azimuthal directions φ=0 to 360°) only has a small variation from the geometric area of the triangle T1 as viewed in a perpendicular direction to the display surface (θ=0°). Thus, even when viewed in an oblique direction, a vivid color displaying similar to when viewed in a perpendicular direction to the display surface is attained.

Incidentally, when light enters the semiconductor layer of a thin film transistor (TFT), a photoelectric conversion occurs in the semiconductor layer, thus causing the threshold of the TFT to fluctuate. A fluctuation in the TFT threshold causes a fluctuation in a voltage to be written to the pixel, whereby display unevenness occurs. In order to block light going into the semiconductor layer of the TFT, and in particular light going into the channel region, it is very preferable for a light shielding layer to exist between the light source section and the semiconductor layer.

In the case of a reverse staggered-type TFT, a gate electrode is provided between the light source section and the semiconductor layer, and thus, if the size of the gate electrode is essentially equal to the size of the semiconductor layer, direct light from the light source section to the channel region can at least be blocked. In other words, it is preferable that the width of the gate electrode along the source-drain direction is about 1.0 times the width of the semiconductor layer along the same direction. Moreover, considering the fact that light travels from the light source section with a certain incident angle relative to the semiconductor layer, the width of the gate electrode is preferably longer than the width of the semiconductor layer. However, a larger gate electrode will result in a larger parasitic capacitance, which has the disadvantage of slowing driving, and therefore the width of the gate electrode is preferably 1.5 times or less, and more preferably 1.2 times or less, of the width of the semiconductor layer.

Even if the aforementioned direct light from the light source section is blocked, there still exists light which is reflected from the drain electrode and goes toward the semiconductor layer. With the display apparatus according to the present embodiment, the amount of such light can be greatly reduced.

Figure 3G:
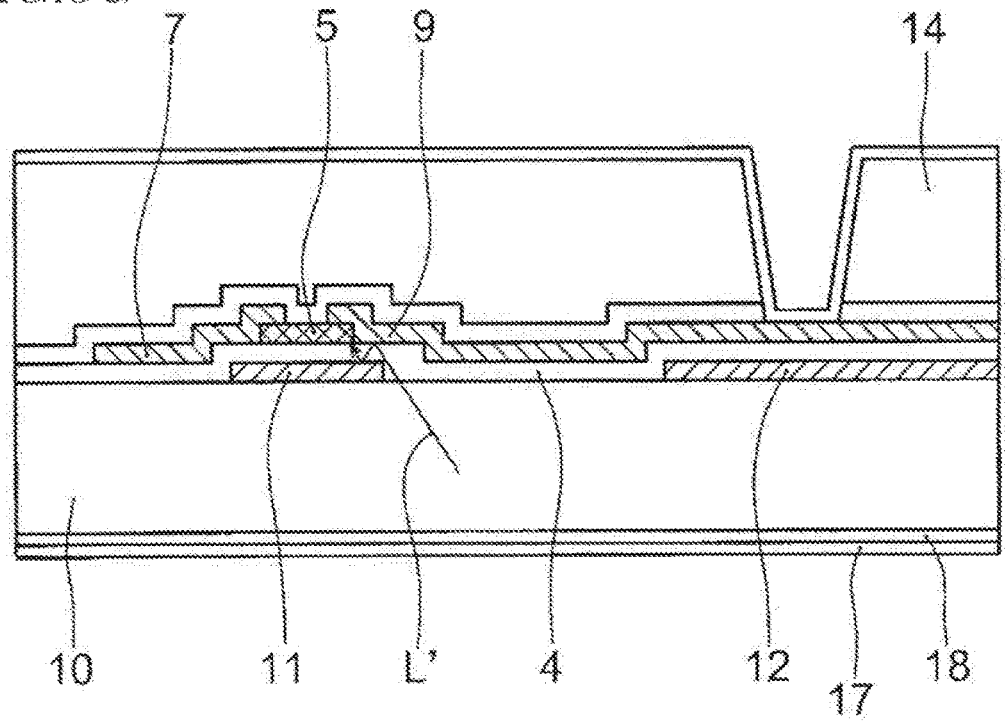
FIG. 3G A schematic illustration showing a path of light entering a TFT substrate in the case where a backlight unit of a conventional example is used.

As shown in FIG. 3G, when a backlight having a broad half width is used, light L' entering the TFT substrate also has a broad incident angle. Even with the gate electrode having an increased size, such light may possibly directly enter the semiconductor layer, and will highly likely be reflected between the drain electrode and the gate electrode, so that light is liable to eventually enter the semiconductor layer in an indirect manner.

Figure 3H:
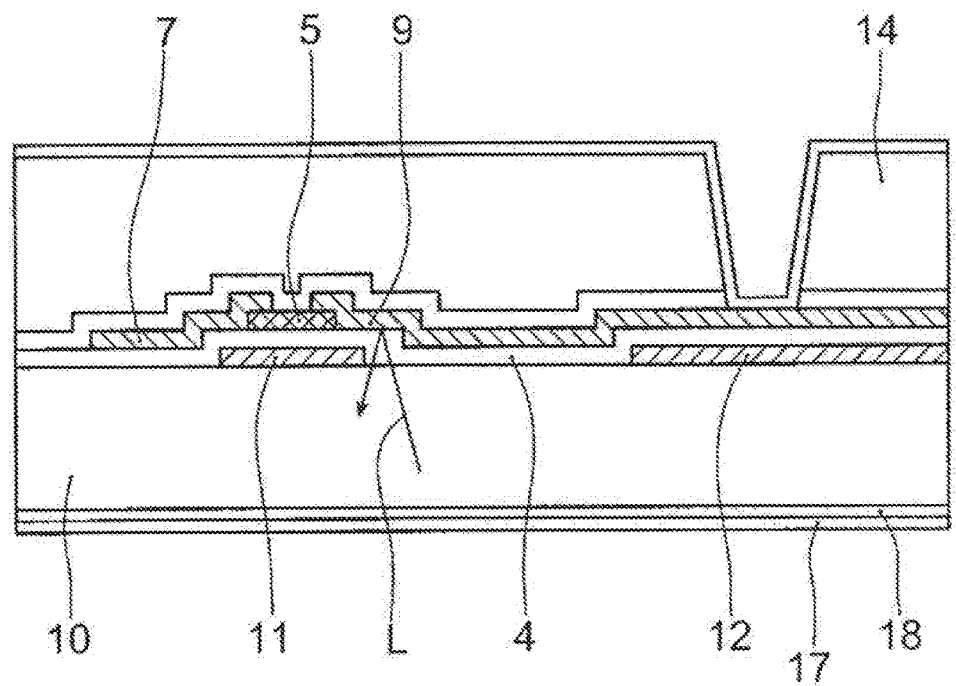
FIG. 3H A schematic illustration showing a path of light entering a TFT substrate in the case where a backlight unit according to an embodiment of the present invention is used.

Since a backlight having a narrowed half width is used in the present embodiment, as shown in FIG. 3H, light L entering the TFT substrate is converged, and the light L entering the TFT substrate has a narrow incident angle. Even if the gate electrode size is made essentially equal to the size of the semiconductor layer, such light is less likely to directly enter the semiconductor layer (in particular channel region), and is very unlikely to be reflected between the drain electrode and the gate electrode, thus considerably restraining light from eventually entering the semiconductor layer. This allows threshold fluctuations of the TFT to be suppressed, and also display unevenness to be suppressed.

Next, a distribution of directors of liquid crystal composition existing in one unit pixel according to the present embodiment will be described with reference to FIG. 4A through FIG. 4F.

FIG. 4A through FIG. 4F show a view of a unit pixel as viewed from the front (front view) and a side view thereof, schematically showing a state of a liquid crystal panel having a liquid crystal layer interposed between two transparent substrates where the director of liquid crystal composition is aligned essentially perpendicular to the substrate in the absence of applied voltage. For ease of explanation, the lower substrate in the figure is regarded as the first substrate 10, and the upper substrate in the figure is regarded as the second substrate 20.

Figure 4B:
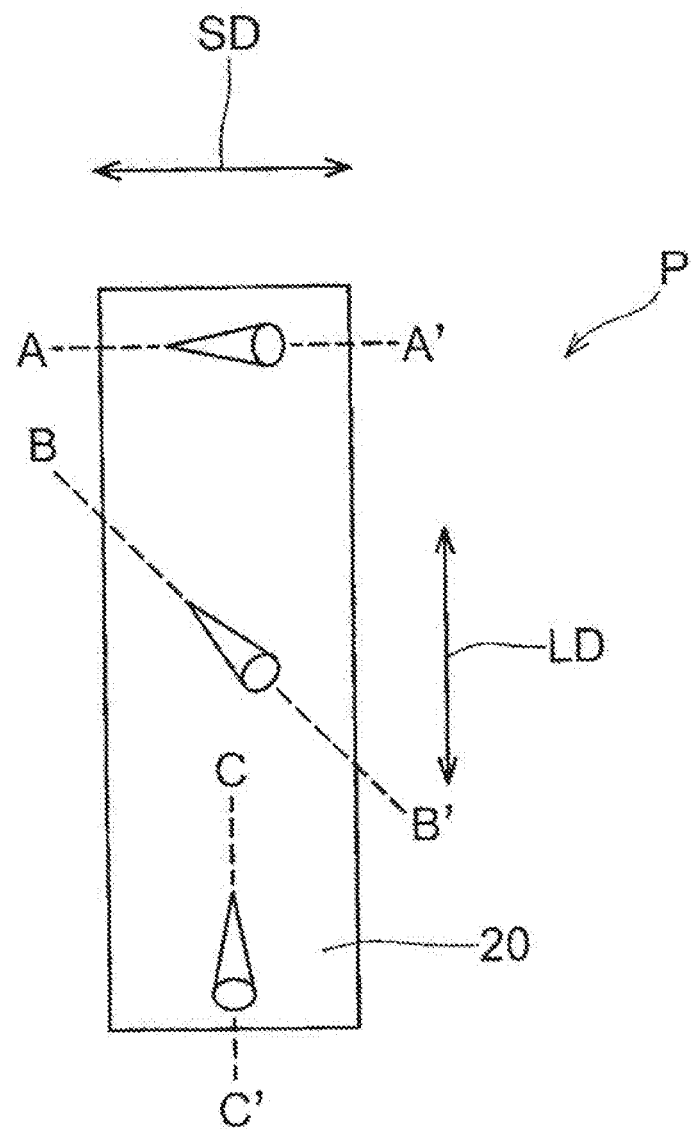
FIG. 4B A schematic illustration showing a director distribution of liquid crystal composition composing a liquid crystal layer in a unit pixel of a display panel according to an embodiment of the present invention.

FIG. 4B shows a front view of the unit pixel in the absence of applied voltage, as viewed through the second substrate 20, illustrating a director of liquid crystal composition in each of: the neighborhood of the first substrate 10; the middle neighborhood between the first substrate 10 and the second substrate 20 (central portion); and the neighborhood of the second substrate 20 in FIG. 4A. In FIG. 4B, the directors are shown as cones, such that the orientation from the vertex to the bottom face (circular portion) of the cone represents the director as viewed through the second substrate 20.

As shown in FIG. 4B, actually, the director of liquid crystal composition gradually changes from the first substrate 10 to the second substrate 20. Specifically, as shown in FIG. 4B, around an axis which is perpendicular to the principal face of the substrate, the director of liquid crystal composition is gradually twisted in a downward (or upward) direction in the figure. This is due to the fact that a structure that enables pretilting of the director of liquid crystal composition is formed on the surface of each alignment film, and the orientation (also referred to as the orientation of the alignment film) that is defined by that structure differs by 90° between the first alignment film 15 and the second alignment film 25.

FIG. 4A schematically shows a side view showing a liquid crystal layer which takes a single alignment state within a unit pixel, as viewed in a direction parallel to a principal face of the substrate. That is, a unit pixel in a display apparatus according to the present embodiment greatly differs from the unit pixel structure under a multi-domain approach, in that a single alignment state of the liquid crystal layer exists within a unit pixel. In FIG. 4A, in order to demonstrate the alignment state of the liquid crystal layer, directors of liquid crystal composition in the neighborhood of the first substrate 10, the middle neighborhood between the first substrate 10 and the second substrate 20, and the neighborhood of the second substrate 20 are all represented as elongated ellipses.

As shown in FIG. 4B, actually, the director of liquid crystal composition gradually changes from the first substrate 10 to the second substrate 20. In other words, FIG. 4A is not a side view as observed in a single direction but rather shows, in a single plan view, consecutive side views as adapted to the twist of the director around an axis which is perpendicular to a principal face of the substrate. Specifically, as shown in FIG. 4B, the director of liquid crystal composition actually is twisted by 90° around an axis which is perpendicular to a principal face of the substrate, gradually in a downward (or upward) direction in the figure; FIG. 4A illustrates, on a single plane, side views of such directors of liquid crystal composition being observed in orientations through a 90° rotation around the aforementioned axis, as adapted to the orientation of the twist. Accordingly, in FIG. 4A, the neighborhood of the second substrate 20 is depicted in a side view as viewed in a shorter-side direction of the unit pixel; the neighborhood of the first substrate 10 is depicted in a side view as viewed in a longer-side direction of the unit pixel, as in a 90° rotation of the substrate; and the middle neighborhood between the first substrate 10 and the second substrate 20 is depicted in a side view as viewed in a direction rotated essentially 45° clockwise as observable from the front of the second substrate 20.

From FIG. 4A and FIG. 4B being taken together, it can be seen that the director of liquid crystal composition in the neighborhood of the second substrate 20 is aligned in a shorter-side direction A-A', and is aligned essentially perpendicular to the second substrate 20 and pretilted toward the A' side in the absence of applied voltage, but that the director of liquid crystal composition in the neighborhood of the first substrate 10 is aligned in a longer-side direction C-C', and is aligned essentially perpendicular to the second substrate 20 and pretilted toward the C' side in the absence of applied voltage. It can also be seen that the director of liquid crystal composition in the middle neighborhood between the first substrate 10 and the second substrate 20 is at a midpoint of gradual change from the shorter-side direction SD along A-A' to the longer-side direction LD along C-C' which is essentially orthogonal thereto, and has a certain angle with respect to each longer side and each shorter side of the pixel (preferably 30 to 60°; and more preferably 40 to 50°), being pretilted toward the B' side.

Herein, the director of liquid crystal composition in the neighborhood of the second substrate 20 constituting a liquid crystal layer in a single alignment state is aligned essentially parallel to the shorter-side direction (A-A') of the rectangle defining the unit pixel; the director of liquid crystal composition in the neighborhood of the second substrate 20 constituting a liquid crystal layer in a single alignment state is aligned essentially parallel to the longer-side direction (C-C') of the rectangle defining the unit pixel; and the director of liquid crystal composition in the neighborhood of the first substrate 10 and the director of liquid crystal composition in the neighborhood of the second substrate 20 are aligned essentially orthogonal to each other.

As described above, in FIG. 4A, the director of liquid crystal composition in the neighborhood of the second substrate 20 is pretilted in the A' direction, the director of liquid crystal composition in the middle neighborhood between the substrates is pretilted in the B' direction, and the director of liquid crystal composition in the neighborhood of the first substrate 10 is aligned in the C' direction, each by an essentially identical angle.

Figure 4D:
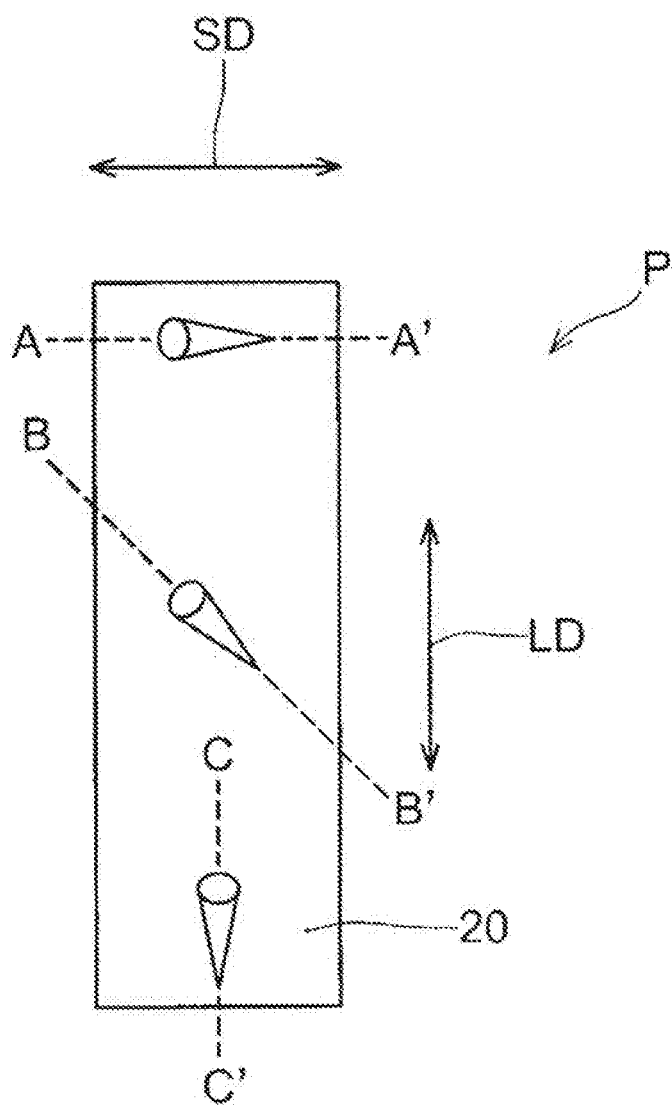
FIG. 4D A schematic illustration showing a director distribution of liquid crystal composition composing a liquid crystal layer in a unit pixel of a display panel according to an embodiment of the present invention.

On the other hand, in FIG. 4C and FIG. 4D, the directions of director pretilt are opposite by 180° to those illustrated in FIG. 4A and FIG. 4B. In other words, the director of liquid crystal composition in the neighborhood of the second substrate 20 is aligned in the shorter-side direction A-A', and is aligned essentially perpendicular to the second substrate 20 and pretilted toward the A side in the absence of applied voltage. On the other hand, the director of liquid crystal composition in the neighborhood of the first substrate 10 is aligned in the longer-side direction C-C', and is aligned essentially perpendicular to the first substrate 10 and pretilted toward the C side in the absence of applied voltage. The director of liquid crystal composition in the middle neighborhood between the first substrate 10 and the second substrate 20 is at a midpoint of gradual change from the shorter-side direction SD along A-A' to the longer-side direction LD along C-C' which is essentially orthogonal thereto, and has a certain angle with respect to each longer side and each shorter side of the pixel (preferably 30 to 60°; and more preferably 40 to 50°), being pretilted toward the B side.

FIG. 4A and FIG. 4B show a director distribution in the liquid crystal layer within the liquid crystal panel in the absence of applied voltage. As the director becomes inclined in the pretilt orientation with voltage application, retardation of the liquid crystal layer changes, so that transmittance of the liquid crystal panel changes in accordance with the inclination of the director relative to the incident direction of light from the light source.

In the present specification, the term "incline (d)" used with respect to the director of liquid crystal composition refers to the director of liquid crystal composition, which is aligned with a pretilt relative to a perpendicular direction to the substrate in the absence of applied voltage between the glass substrates, becoming inclined (i.e., moving closer to a parallel direction to the substrates) with voltage application between the glass substrates. An "angle of inclination" refers to an angular variation of a director in the absence of applied voltage to a director under an applied voltage.

In FIG. 4C and FIG. 4D, opposite changes in retardation occur under an applied voltage, relative to FIG. 4A and FIG. 4B. By appropriately combining a plurality of pixels, such that the liquid crystal composition contained in them will result in mutually different pretilt orientations, influences of change in retardation can be alleviated, whereby quality can be improved. Details thereof will be separately described later.

Figure 4E:
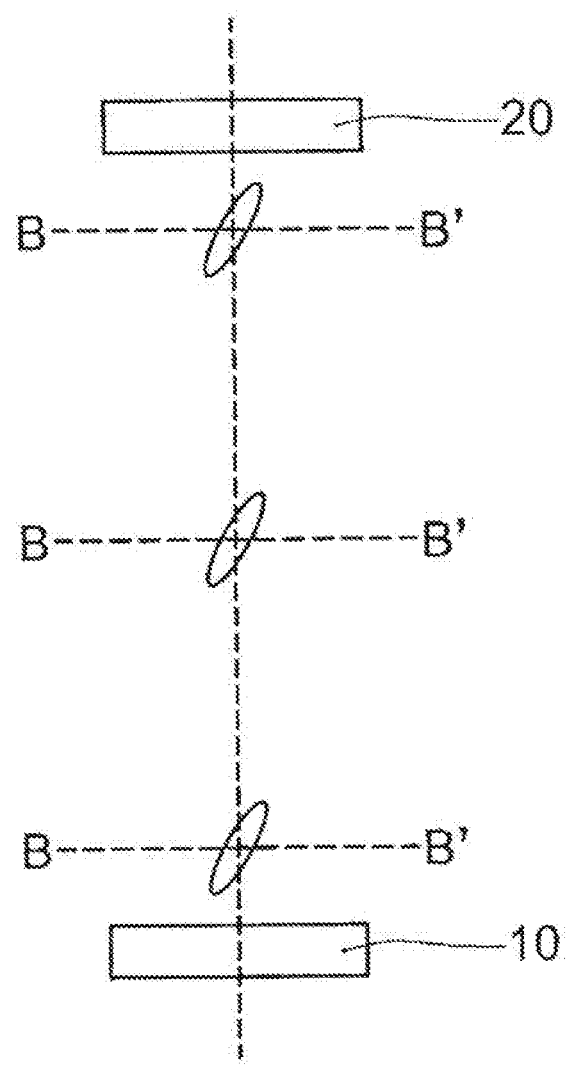
FIG. 4E A schematic illustration showing a director distribution of liquid crystal composition composing a liquid crystal layer in a unit pixel of a display panel according to an embodiment of the present invention.

FIG. 4E and FIG. 4F are a side view and a front view, respectively, in the case where the director of liquid crystal composition in the liquid crystal layer is inclined in a uniform direction (B-B' in the figure) between the first substrate 10 and the second substrate 20. FIG. 4A through FIG. 4D illustrate an implementation where, because of the orientation of the first alignment film 15 and the orientation of the second alignment film 25 being shifted by 90°, the director of liquid crystal composition is gradually twisted around an axis which is perpendicular to a principal face of the substrate. In FIG. 4E and FIG. 4F, however, the orientation of the first alignment film 15 and the orientation of the second alignment film 25 are identical, and therefore the director of liquid crystal composition is not twisted. In this case, the direction of tilt, as in the central portion (B-B') in FIG. 4A through FIG. 4D, has a certain angle (preferably 30 to 60°; more preferably 40 to 50°) with respect to each longer side and each shorter side of the pixel.

In order to create an alignment state of the liquid crystal layer as shown in FIG. 4A through FIG. 4F, the director of liquid crystal composition needs to be inclined (pretilted) from the perpendicular direction at an interface between the liquid crystal layer and a photo-alignment film. In order to easily realize such a pretilt, a photo-alignment technique can be used (see, for example, Patent Document 5). A photo-alignment technique is a method in which, by using a photo-alignment film as an alignment film, a photo-alignment film is irradiated (exposure) with light such as ultraviolet, thereby generating an alignment regulating force in the alignment film, or changing the direction of alignment which is regulated by the alignment film. In a photo-alignment technique, an alignment treatment for the alignment film can be performed without involving any contact, so that contamination, generation of artifacts, etc., during the alignment treatment can be suppressed. Moreover, since a photomask is used during exposure, a given plurality of regions of the photo-alignment film can be subjected to exposure under different conditions.

Specifically, after given surfaces of two substrates (i.e., a TFT substrate corresponding to the first substrate and a CF substrate corresponding to the second substrate) are coated with photo-alignment films, each photo-alignment film may be irradiated with ultraviolet light from an oblique direction, whereby a structure that enables pretilting of the director of liquid crystal composition can be formed on the surface of the photo-alignment film. In order to realize the present embodiment, it is necessary that the aforementioned structure be provided in opposite orientations that are 180° apart in a first unit pixel and a second unit pixel that is in the same row or the same column as the first unit pixel. Patent Document 5 neither teaches nor suggests providing the aforementioned structure in opposite orientations that are 180° apart in a first unit pixel and a second unit pixel that is in the same row or the same column as the first unit pixel; however, in the second unit pixel which was not irradiate with ultraviolet light during exposure of the first unit pixel, ultraviolet light may be radiated so as to form the aforementioned structure in an opposite orientation that is 180° apart from the first unit pixel.

As has been described above with reference to FIG. 6A and FIG. 6B, retardation of light which is within a plane between B-B' where the director of liquid crystal composition is inclined and which is obliquely transmitted from a direction that is perpendicular to the substrate plane behaves as follows: when the director of liquid crystal composition is inclined so as to result in an increased angle between the light path direction and the director, the retardation increases relative to that of the light which is transmitted in a perpendicular direction to the substrate plane; and, when the director of liquid crystal composition is inclined in the opposite direction, the retardation decreases. This causes asymmetry regarding the direction in which the director of liquid crystal composition is inclined, thus resulting in some viewing angle dependence.

In the display panel 40 according to the present embodiment, as the retardation of light which is transmitted in a perpendicular direction to the first substrate 10 increases, the light transmittance increases in response to an increase in the voltage for controlling the light transmittance of the display panel 40.

The VA approach has evolved by eliminating this asymmetry. At first, regions with different directors of liquid crystal composition were created by providing a projection within a single pixel (see Non-Patent Document 4). Thereafter, a PSA (Polymer Sustained Alignment) approach was developed which involves mixing a monomer to undergo a photochemical reaction within the liquid crystal layer and immobilizing the monomer with light while applying a voltage by using a slitted electrode, and regions with different directors of liquid crystal composition were provided. Thereafter, the aforementioned photo-alignment approach described in Patent Document 5 was developed. Thus, every VA approach has evolved as a technique that creates a plurality of directors of liquid crystal composition within a single unit pixel. In other words, there has never existed a technique in which asymmetry from unit pixel to unit pixel is compensated for while a single unit pixel exists within a single alignment state of the liquid crystal layer.

A characteristic of the present embodiment, which compensates for asymmetry while a single alignment state of the liquid crystal layer exists within a single unit pixel, is illustrated in FIG. 8A through FIG. 8E. The structures shown in FIG. 8A through FIG. BE are produced by partially modifying the material and process in the photo-alignment approach described in Patent Document 5 from the proprietary standpoint of the inventors, and not only the construction is proprietary, but also there is a considerable advantage in producibility.

Figure 8A:
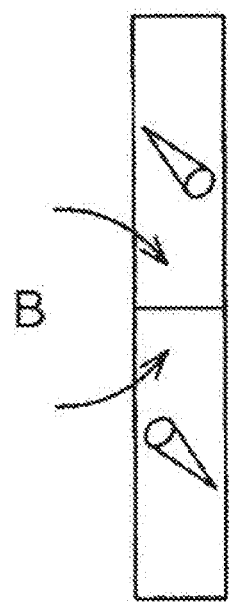
FIG. 8A A diagram showing a relationship between directors of liquid crystal composition existing in the central portions of respective unit pixels among a plurality of adjacent unit pixels, where phase compensation is made in the vertical direction.
Figure 8B:
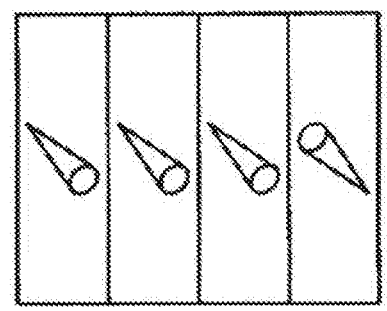
FIG. 8B A diagram showing a relationship between directors of liquid crystal composition existing in the central portions of respective unit pixels among a plurality of adjacent unit pixels, illustrating an example where phase compensation is made in the lateral direction.
Figure 8C:
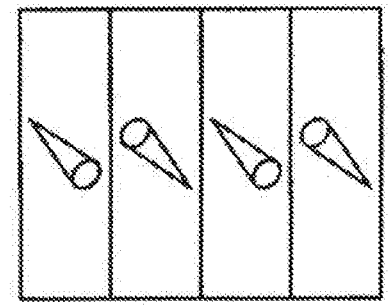
FIG. 8C A diagram showing a relationship between directors of liquid crystal composition existing in the central portions of respective unit pixels among a plurality of adjacent unit pixels, illustrating another example where phase compensation is made in the lateral direction.
Figure 8D:
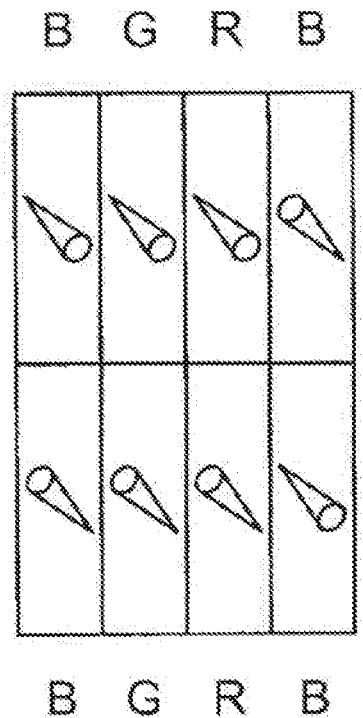
FIG. 8D A diagram showing a relationship between directors of liquid crystal composition existing in the central portions of respective unit pixels among a plurality of adjacent unit pixels, illustrating an example where phase compensation is made in both the vertical and lateral directions.

The dimensions of the unit pixel are illustrated as constituting a rectangle having an aspect ratio of 3:1. Although the process of performing local irradiation by using a mask for photo-alignment is the same as in Patent Document 5, the striped mask pattern is different. In conventional approaches, for example, it is necessary to radiate stripes of light with a pitch that is ½ of the shorter-side direction of a single rectangular pixel. On the other hand, in order to produce the structure of FIG. 8A, the regions to be irradiated with stripes of light may have the same pitch as the length along the vertical direction of the pixel. Since the pitch of the stripes will be six times as large as the conventional pitch, there will be six times as large an alignment margin, whereby the margin concerning dimensions in pixel design and producibility are considerably improved. In the structures of FIG. 8B and FIG. 8D, too, the stripe pitch will be six times as large as the conventional pitch. In the case of FIG. 8A, its lateral stripes may be turned into vertical stripes. In the case of FIG. 8C and FIG. BE, it is necessary to radiate light for each pitch along the shorter-side direction, thus resulting in a ⅓ pitch as compared to FIG. 8A, FIG. 8B, and FIG. 8D, but this is twice as large in the approach described in Patent Document 5; thus it may be said that, in the present embodiment, the dimensional margin in pixel design and producibility are improved.

FIG. 8A through FIG. BE illustrate that, in a construction arranged so that increases or decreases in retardation are canceled out between adjacent pixels for oblique incident light, two pixels mutually work to compensate for asymmetry, thus greatly alleviating viewing angle dependence.

In order for two pixels to mutually compensate for asymmetry, it is necessary that the director of liquid crystal composition in the first unit pixel be in an opposite orientation with respect to the director of liquid crystal composition in the second unit pixel. Specifically, this is achieved when, given an azimuth angle φ of the director of liquid crystal composition in the first unit pixel, the director of liquid crystal composition is in the second unit pixel is inclined in an azimuthal direction of φ+180°.

In the present specification, the expression "adjacent" as used in regard to pixels means being in the same row or the same column as, without having to be directly adjacent to, a selected unit pixel (first unit pixel) among a plurality of unit pixels arranged in a matrix along the row direction and along the column direction. Examples of "second unit pixels" that are adjacent to the first unit pixel include: unit pixels (e.g., FIG. 8A, FIG. 8C, FIG. 8E) that are adjacent to the first unit pixel along at least one of the row direction and the column direction; unit pixels (e.g., FIG. 8A, FIG. 8B, FIG. 8D) that are included in a second color filter set that is adjacent along at least one of the row direction and the column direction to a first color filter set that includes the first unit pixel; and more specifically, unit pixels that are adjacent to the first unit pixel along the column direction (e.g., FIG. BA, FIG. BE), unit pixels that are adjacent to the first unit pixel along the row direction (e.g., FIG. 8C, FIG. BE), unit pixels that are the closest unit pixels corresponding to the color filter of the same color as the first unit pixel along the row direction (e.g., FIG. 8B), and so on. In the present specification, a "color filter set" is meant to be a set constituting a single picture element (e.g., a set of RGB) of color filters.

FIG. 8A shows a construction in which the director of liquid crystal composition is in opposite orientations between pixels along the vertical direction that belong to a single primary color. Although the example is directed to blue (B), the same may similarly apply to green (G) or red (R).

Figure 8E:
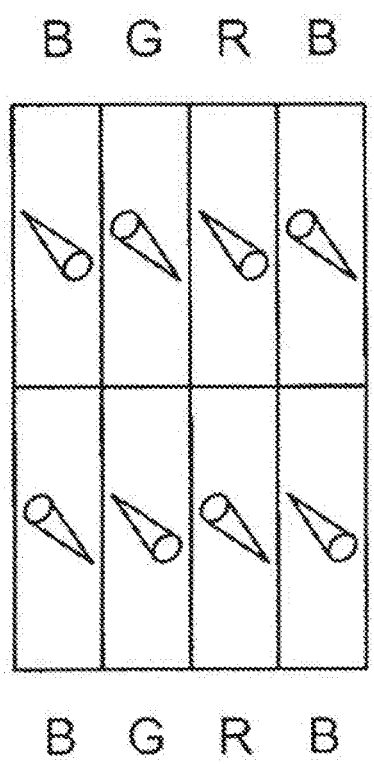
FIG. 8E A diagram showing a relationship between directors of liquid crystal composition existing in the central portions of respective unit pixels among a plurality of adjacent unit pixels, illustrating another example where phase compensation is made in both the vertical and lateral directions.

FIG. 8B shows a construction in the director of liquid crystal composition is in opposite orientations between pixels of the same color along the lateral direction. The director of liquid crystal composition is inclined in the same direction for the three primary colors, i.e., blue (B), green (G), and red (R). FIG. 8C shows a construction in the director of liquid crystal composition is in opposite orientations between any adjacent pixels of blue (B), green (G), and red (R) along the lateral direction. FIG. 8D is a construction combining FIG. 8A and FIG. 8B, whereas FIG. 8E is a construction combining FIG. 8A and FIG. 8C.

Symmetry compensation within the unit pixel is not made in any of FIG. 8A through FIG. 8E; this is not a problem, as will be described below. In high-resolution displaying such as 4K, DCI, and 8K or above, there is hardly any possibility that image information may considerably change between adjacent pixels. In video information, for example, brightness information that is incident on an image sensor through a camera lens is converted from analog information to digital signal. Thus, what is sent to a two-dimensional display screen is digital information that has been converted from analog video information.

A camera lens has its inherent properties, i.e., a focal length of the lens and how open its aperture is (f number), a relationship between which determines a depth of field. The depth of field indicates a depth across which focus is achieved. The narrower the aperture, the shallower the depth of field; however still, the region that requires high resolution will be limited. Therefore, most of the displaying region will have some blur, and information for adjacent pixels will be identical, and even if on the focal point, there will be little variation therebetween. Therefore, there is no real harm if phase compensation is made between adjacent pixels, and thus the arrangements shown in FIG. 8A through FIG. BE are all effective constructions for essentially eliminating viewing angle characteristics.

In the case of the multi-domain approach, a discrete border line is known to occur between one domain and another as a dark line, extending along the array of directors of liquid crystal composition. It is a front view of a unit pixel P under the conventional VA approach as viewed from the front, directed to an example of four domains as split into four. This dark line will have a width of several microns because of a long-range interaction of liquid crystal composition, and needs to be eliminated. Moreover, transmittance gently increases in a direction away from the neighborhood of the dark line, and thus not only the portion appearing as a dark line but also a peripheral region of the dark line will also be detrimental to efficiency of light utilization. This phenomenon will be especially problematic in high-resolution applications.

Thus, under the multi-domain approach, many factors which may lower transmittance exist within a small unit pixel. To begin with, when designing a small unit pixel, it is necessary to reduce the size of thin film transistors and other circuitry elements, and furthermore the interval between the wiring and the thin film transistor circuit needs to be shortened. These make it less easy to design and manufacture high-resolution display apparatuses, e.g., 4K, DCI, 8K, by using the multi-domain approach.

Next, double-speed driving, which is already adopted in many liquid crystal display apparatuses of popular types, will be discussed. When liquid crystal panels for television sets first emerged, 60 Hz driving, which displays video in 60 frames per second, was commonplace. Currently, however, so-called double-speed driving, i.e., 120 Hz driving, is adopted. However, in high-resolution, the number of scanning lines drastically increases, and the write time for switching between ON or OFF of the transistor that is assigned to one scanning line becomes shorter, thus making double-speed driving very difficult. Furthermore, under the multi-domain approach, discrete regions existing between one domain and another and extending along the array of directors of liquid crystal composition, considerably lower the response speed.

Thus, with the display apparatus according to the present embodiment, it is possible to prevent decreases in transmittance and response speed that are associated with discrete regions occurring at boundaries between split pixels and extending along the array of directors of liquid crystal composition.

Figure 5A:
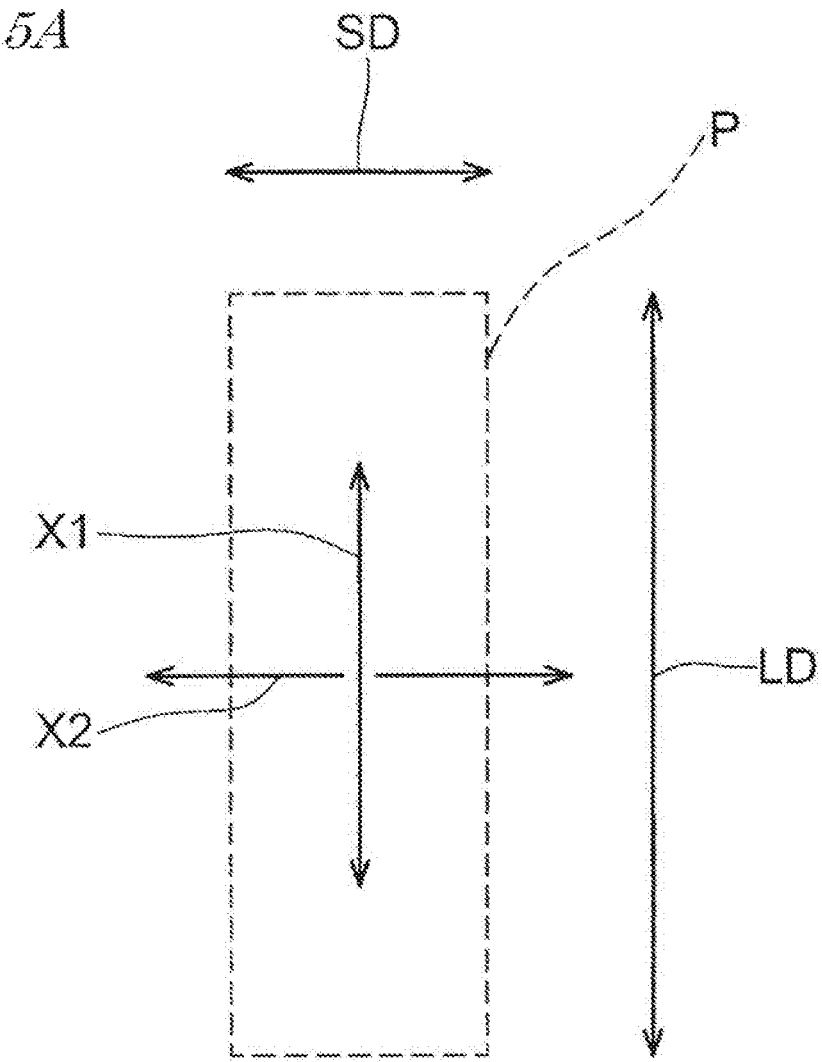
FIG. 5A A diagram showing a relationship between a single pixel structure and transmission axes of polarizing plates in an embodiment of the present invention, illustrating one example of transmission axes of polarizing plates.
Figure 5B:
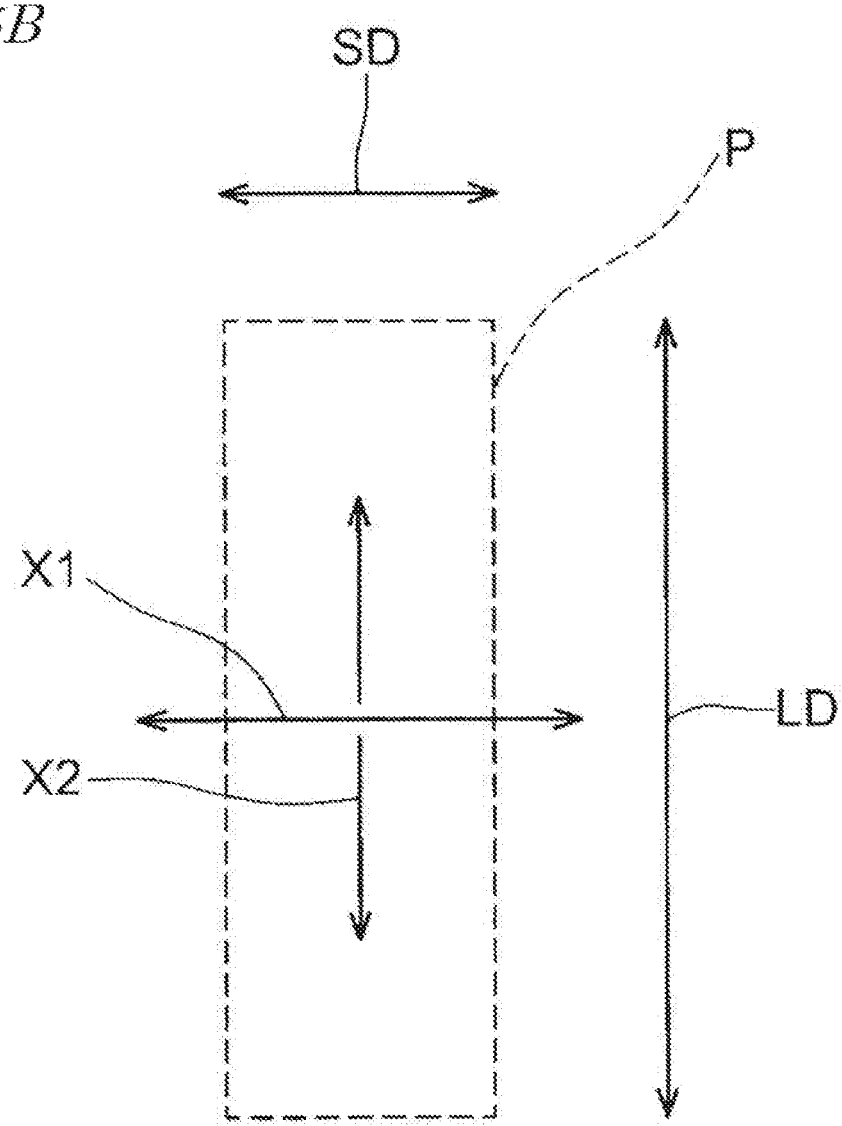
FIG. 5B A diagram showing a relationship between a single pixel structure and transmission axes of polarizing plates in an embodiment of the present invention, illustrating another example of transmission axes of polarizing plates.

An example arrangement of pixels and transmission axes of polarizing plates according to the present embodiment will be described with reference to FIG. 5A and FIG. 5B. FIG. 5A and FIG. 5B are both front views of a unit pixel P as viewed from the front. FIG. 5A and FIG. 5B show a single pixel structure opposed to a color filter of a single color, which herein is illustrated as a rectangle that is elongated along the vertical direction. FIG. 5A and FIG. 5B are diagrams showing transmission axis directions for linearly polarized light emitted from the polarizing plates. In the example of FIG. 5A, a transmission axis X1 of a polarizing plate that is in front of the liquid crystal panel is essentially parallel to the longer-side direction LD of the pixel, while a transmission axis X2 of the polarizing plate behind it is essentially parallel to the shorter-side direction SD. In the example of FIG. 5B, conversely, a transmission axis X1 of the polarizing plate in front of the liquid crystal panel is essentially parallel to the shorter-side direction SD of the pixel, while a transmission axis X2 of the polarizing plate behind it is essentially parallel to the longer-side direction SD.

In both of FIG. 5A and FIG. 5B, transmission axis directions for linearly polarized light from the polarizing plates are arranged so as to be parallel or orthogonal to the longer sides or the shorter sides of the displaying region of the liquid crystal panel. From the standpoints of producibility of polarizing plates to be produced in a roll-to-roll manner and efficiency of area utilization, such an arrangement is effective, for the following reasons. Firstly, as for each polarizing plate, a polyvinyl alcohol (PVA) resin is impregnated with and caused to absorb iodine in an aqueous solution, and it is drawn along its longitudinal direction as a rolled film, whereby it acquires a polarizing property. Therefore, the constructions of FIG. 5A and FIG. 5B have an advantage in that essentially the entire region along the transverse direction of the rolled film can be efficiently utilized. Secondly, when the polarizing plate is to be cut in parallel to the drawing direction of the PVA resin, cutting it with a cutter along the drawing direction after the drawing provides an enhanced precision along the axial direction (angle). This high precision greatly contribute to a high contrast ratio.

Figure 9:
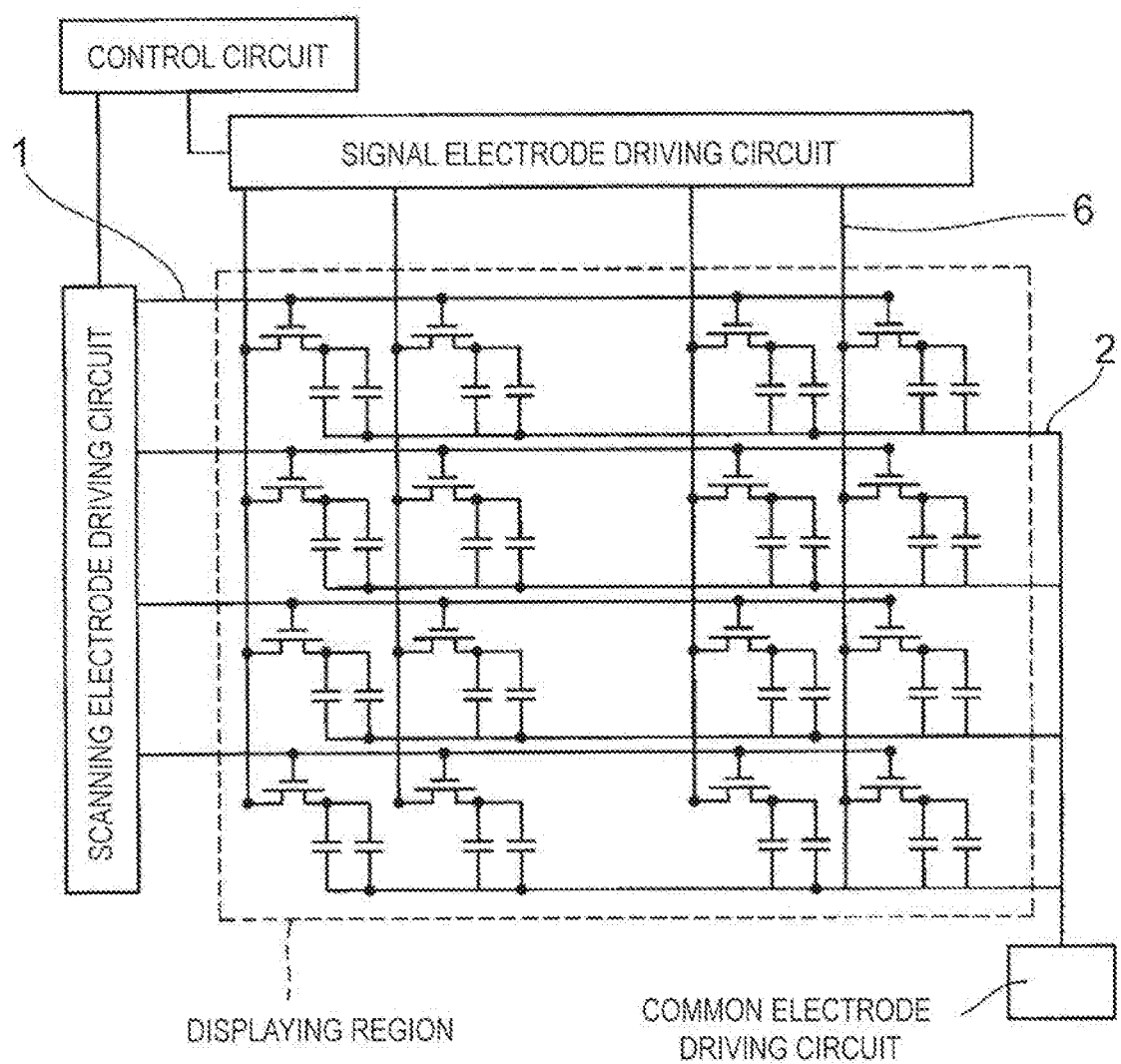
FIG. 9 A schematic diagram of a display panel circuit composing an embodiment of the present invention.

FIG. 9 is a schematic diagram showing a liquid crystal display module construction including the display panel and peripheral circuitry, where the interior of the panel is illustrated by an equivalent circuit. From a control circuit which signals image information, voltage waveforms which signal image information are sent to a signal electrode driving circuit and a scanning electrode driving circuit in synchronization, based on a clock signal generated from a clock. From the signal electrode driving circuit, waveforms reflecting the image information are sent to signal line electrodes. The scanning electrode driving circuit selects a lateral line, and sends a waveform for turning the TFT ON or OFF to that scanning line.

Although in the actual pixel the equivalent circuitry will be profuse with parasitic capacitances, resistance components, etc., in this figure the liquid crystal layer and storage capacitors are both depicted as capacitors for the sake of simplification.

Figure 10:
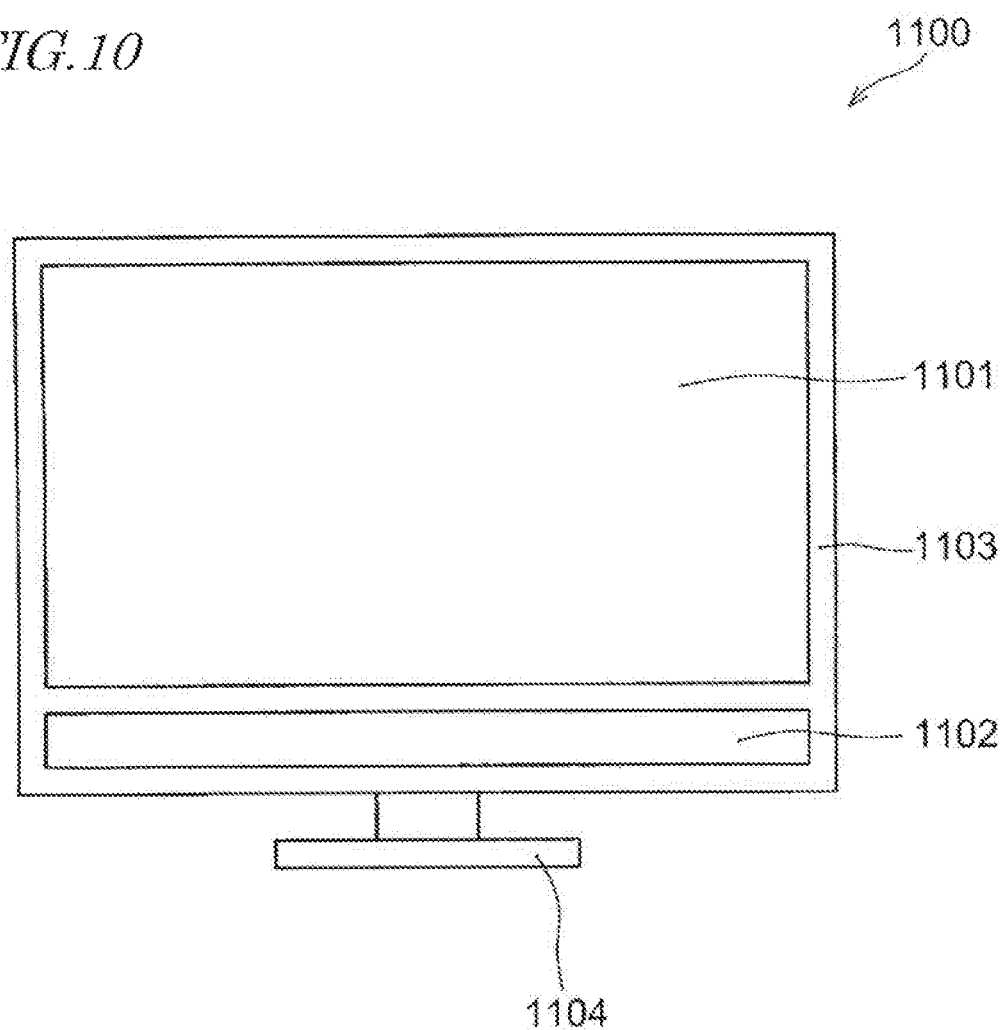
FIG. 10 A schematic diagram of a display apparatus according to an embodiment of the present invention.

The display apparatus 100 according to the above embodiment is eligible for a television application as shown in FIG. 10, for example. It includes, as shown in FIG. 10, a television set 1100, a display section 1101, a loudspeaker 1102, a cabinet 1103, a stand 1104, and so on.

The liquid crystal display apparatus according to the above embodiment is suitably applicable as the display section 1101. By adopting the liquid crystal display apparatus according to the above embodiment as the display section 1101 of the television set 1100, video with little viewing angle dependence can be displayed.

Although the above embodiment exemplifies the thin-type television set 1100 including the display section 1101, this is not a limitation; it is also suitably applicable to digital signage that is installed for displaying various information at train stations, shopping malls, event venues, or the like. In particular, it is effective for digital signage for uses that require high resolution and low viewing angle dependence, e.g., monitors for medical use.

As for television sets and digital signage, many include relatively large-sized display sections of about 32 inches to 80 inches, but this is not a limitation; medium- or small-sized display sections, e.g., laptop computers, desktop monitors, or mobile electronic devices, are also suitable.

REFERENCE SIGNS LIST 1 gate bus line, 2 common bus line, 3 thin film transistor (TFT: Thin Film Transistor), 4 gate insulating film, 5 semiconductor layer, 6 source bus line, 7 source electrode, 8 pixel electrode, 9 drain electrode, 10 glass substrate (first substrate), 11 gate electrode, 12 common electrode, 13 interlayer insulating film, 14 organic insulating film, 15 first alignment film, 16 phase plate, 17 polarizing plate, 18 first surface, 19 contact hole, 20 glass substrate (second substrate), 21 color filter, 22 black matrix, 23 spacer, 24 counter electrode, 25 second alignment film, 26 phase plate, 27 polarizing plate, 28 second surface, 30 liquid crystal layer, 40 liquid crystal panel (display panel), 50 backlight unit (light source), 60 viewing angle enlarging film (light diffusing member), 100 display apparatus, 1100 television set, 1101 display section, 1102 loudspeaker, 1103 cabinet, 1104 stand

The invention claimed is:
1. A display apparatus comprising:
a display panel including a first substrate and a second substrate, a liquid crystal layer retained therebetween, a first alignment film provided on a surface of the first substrate facing toward the liquid crystal layer, and a second alignment film provided on a surface of the second substrate facing toward the liquid crystal layer,
a light source section to emit light toward the first substrate; and
a light diffusing member having a light input plane facing toward the display panel and a light output plane as an opposite plane, the light diffusing member allowing light which is emitted from the display panel to be diffused and output from the light output plane, wherein,
all of a plurality of directors of liquid crystal composition composing the liquid crystal layer are essentially perpendicular to the first alignment film and the second alignment film in an absence of applied voltage;

a liquid crystal layer included in each of a plurality of unit pixels arranged in a matrix along a row direction and along a column direction has a single alignment state;

a director of liquid crystal composition located at a central portion in a first unit pixel that is one of the plurality of unit pixels is in an opposite orientation with respect to a director of liquid crystal composition located at a central portion in a second unit pixel that is in a same row or a same column as the first unit pixel;

the light source section includes a light converging member to converge light from the light source section and emit the light toward the display panel;

a full width of a polar angle corresponding to a decrement from a luminance at the front of light which is output from the light output plane to ⅓ of the luminance is 85° or more but less than 180°; and a full width of a polar angle corresponding to a decrement from a luminance at the front of light which is emitted from the light source section to ½ of a maximum luminance thereof is 40° or less.

2. The display apparatus of claim 1, wherein the second unit pixel is adjacent to the first unit pixel along at least one of the row direction and the column direction.

3. The display apparatus of claim 1, wherein the second unit pixel is included in a second color filter set that is, along one of the row direction and the column direction, adjacent to a first color filter set that includes the first unit pixel.

4. The display apparatus of claim 1, wherein, in the absence of applied voltage, the director of liquid crystal composition is aligned with a pretilt in a range of not less than 0.5° and not more than 5° relative to a perpendicular direction to the first alignment film and the second alignment film.

5. The display apparatus of claim 1, wherein the liquid crystal composition contains liquid crystal molecules having negative dielectric anisotropy.

6. The display apparatus of claim 1, wherein a single thin film transistor of a reverse staggered type is included in each of the plurality of unit pixels.

7. The display apparatus of claim 6, wherein a light shielding layer is formed to block direct light from a light source section to a semiconductor layer composing the thin film transistor.

8. The display apparatus of claim 7, wherein the light shielding layer is a gate electrode.

9. The display apparatus of claim 8, wherein a width of the gate electrode along a source-drain direction is 1.5 times or less of a width of the semiconductor layer along the source-drain direction.

10. The display apparatus of claim 9, wherein the width of the gate electrode along the source-drain direction is larger than the width of the semiconductor layer along the source-drain direction.

11. The display apparatus of claim 8, wherein a width of the gate electrode along a source-drain direction is 1.2 times or less of a width of the semiconductor layer along the source-drain direction.

12. The display apparatus of claim 11, wherein the width of the gate electrode along the source-drain direction is larger than the width of the semiconductor layer along the source-drain direction.

13. The display apparatus of claim 1, wherein, in the light diffusing member, a plurality of light diffusing portions are provided between the light input plane and the light output plane to allow light which is emitted from the display panel to be output from the light output plane, with an angular distribution thereof expanded, and a light shielding portion is provided in a region excluding the light diffusing portions.

14. The display apparatus of claim 1, wherein each of the first alignment film and the second alignment film is a photo-alignment film, and wherein an orientation direction defined by the first alignment film differs from an orientation direction defined by the second alignment film by substantially 90°.

* * * * *